(12) United States Patent
Ishii et al.

(10) Patent No.: US 6,972,767 B2
(45) Date of Patent: Dec. 6, 2005

(54) IMAGE PROCESSING APPARATUS AND METHOD, RECORDING MEDIUM, AND PROGRAM

(75) Inventors: Shinya Ishii, Tokyo (JP); Norikazu Hiraki, Tokyo (JP); Hiroyuki Segawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 10/387,581

(22) Filed: Mar. 14, 2003

(65) Prior Publication Data

US 2003/0210283 A1  Nov. 13, 2003

(30) Foreign Application Priority Data

Mar. 25, 2002 (JP) .............................. 2002-084096

(51) Int. Cl.$^7$ .............................................. G06T 15/70

(52) U.S. Cl. ....................... 345/473; 345/474; 715/757

(58) Field of Search ................................ 345/473, 474, 345/594; 715/757

(56) References Cited

U.S. PATENT DOCUMENTS

| | | | | |
|---|---|---|---|---|
| 5,237,647 A | * | 8/1993 | Roberts et al. | 345/419 |
| 5,717,848 A | * | 2/1998 | Watanabe et al. | 345/474 |
| 6,529,210 B1 | * | 3/2003 | Rees | 345/654 |

* cited by examiner

Primary Examiner—Richard Hjerpe
Assistant Examiner—Andrew Yang
(74) Attorney, Agent, or Firm—Oblon, Spivak, McClelland, Maier & Neustadt, P.C.

(57) ABSTRACT

An image processing apparatus for displaying a 3D object as a moving image includes a designating unit for designating a position and an attitude of an animation object to which animation parameters are set in advance and the 3D object in a virtual 3D space; a first determining unit for determining whether or not the 3D object and the animation object cross each other; a second determining unit for determining whether or not the animation parameters set to the animation object are already set to the 3D object, if it is determined that the 3D object and the animation object cross each other; a setting unit for setting the animation parameters to the 3D object if it is determined that the animation parameters are not set to the 3D object; and a display control unit for controlling the 3D object to be displayed in accordance with the animation parameters.

11 Claims, 27 Drawing Sheets

| ANIMATION | CON-TAINED | CON-TACTING | SIMULTA-NEITY | SE-QUENCY | FOLLOWED BY LOWER ORDER | FOLLOWED BY HIGHER ORDER | FOLLOWED BY ALL | FUNCTIONING AS ANIMATION OBJECT |
|---|---|---|---|---|---|---|---|---|
| COUNTERCLOCKWISE ROTATION | 1 | 0 | 1 | 0 | 0 | 1 | 0 | 0 |
| CLOCKWISE ROTATION | 0 | 1 | 0 | 5 | 1 | 0 | 0 | 0 |
| VERTICAL RECIPROCATION | 1 | 0 | 0 | 1 | 1 | 0 | 0 | 0 |
| DEFLECTION | 0 | 1 | 3 | 0 | 0 | 1 | 0 | 0 |
| TWIST | 1 | 0 | 0 | 3 | 0 | 0 | 1 | 0 |
| STRETCH | 1 | 0 | 2 | 0 | 0 | 0 | 1 | 0 |
| COUNTERCLOCKWISE ROTATION AND VERTICAL RECIPROCATION | 1 | 0 | 0 | 7 | 0 | 0 | 0 | 1 |
| CLOCKWISE ROTATION AND VERTICAL RECIPROCATION | 0 | 1 | 0 | 5 | 1 | 0 | 0 | 0 |
| .... | .... | .... | .... | .... | .... | .... | .... | .... |

IMAGE PROCESSING APPARATUS AND METHOD, RECORDING MEDIUM, AND PROGRAM

BACKGROUND OF THE INVENTION

1. Field of the Invention

The present invention generally relates to image processing apparatuses and methods, recording media, and programs, and particularly relates to an image processing apparatus and method, a recording medium, and a program in which a three-dimensional (3D) object to be displayed within a virtual 3D space on a display is readily displayed as a moving image.

2. Description of the Related Art

A lot of software realizes computer graphics such as moving images in which shapes, positions, angles, and the like of 3D objects vary with time.

The known software of this type sets moving images by a method in which a user edits the shape, the position, the angle, and the like of a 3D object to be animated at each point in time which is obtained by dividing a predetermined time zone a few times. Hereinafter, the aspect of the 3D object at each point in time is referred to as a keyframe.

For such a method for setting moving images, however, the shape, the position, the angle, and the like of objects must be edited keyframe by keyframe. Thus, increased objects to be animated and more complicated moving images need a longer setting time.

Furthermore, each software program has an interface distinct from that of other software programs, and operation for each of the software programs is not quickly understandable and is always complicated. Thus, the user must gain experience for operating each of the software programs in order to complete the operation for each of the software programs in a short time. Therefore, setting moving images is not a simple operation for every user.

Also, in order to display different types of 3D objects in accordance with one moving image, setting of the moving image must be performed on each of the 3D objects, thus resulting in inefficient setting.

Moreover, since a longer time is needed for setting moving images in the known method, the user cannot interactively change a plurality of moving images and a plurality of 3D objects in order to animate the 3D objects.

SUMMARY OF THE INVENTION

Accordingly, it is an object of the present invention to enable a user to interactively change many and complicated objects in order to readily display 3D objects as moving images in a short time by using a consumer-level computer.

An image processing apparatus according to the present invention includes a designating unit for designating a position and an attitude of an animation object to which animation parameters are set in advance and the 3D object in a virtual 3D space; a first determining unit for determining whether or not the 3D object and the animation object cross each other; a second determining unit for determining whether or not the animation parameters set to the animation object are already set to the 3D object, if the first determining unit determines that the 3D object and the animation object cross each other; a setting unit for setting the animation parameters to the 3D object if the second determining unit determines that the animation parameters are not set to the 3D object; and a display control unit for controlling the 3D object to be displayed in accordance with the animation parameters set by the setting unit.

The image processing apparatus may further include a first operating unit for instructing combination of the 3D object and the animation object. When the combination is instructed, the animation parameters can be set.

The image processing apparatus may further include a canceling unit for canceling the setting of the animation parameters for the 3D object if the second determining unit determines that the animation parameters are already set to the 3D object.

The image processing apparatus may further include a second operating unit for instructing release of combination of the 3D object and the animation object. When the release of the combination is instructed, the setting of the animation parameters can be released.

The setting unit may set animation parameters of different types of moving images to the 3D object if different types of animation objects cross the 3D object.

The different types of moving images may appear simultaneously or sequentially.

Preferably, the animation object has a property of contacting the 3D object or a property of being contained in the 3D object.

The animation object may cause the 3D object being crossed with the animation object to function as an animation object.

An image processing method according to the present invention includes a designating step of designating a position and an attitude of an animation object to which animation parameters are set in advance and the 3D object in a virtual 3D space; a first determining step of determining whether or not the 3D object and the animation object cross each other; a second determining step of determining whether or not the animation parameters set to the animation object are already set to the 3D object, if it is determined by the processing in the first determining step that the 3D object and the animation object cross each other; a setting step of setting the animation parameters to the 3D object if it is determined by the processing in the second determining step that the animation parameters are not set to the 3D object; and a display control step of controlling the 3D object to be displayed in accordance with the animation parameters set by the processing in the setting step.

A program stored in a recording medium according to the present invention includes a designating step of designating a position and an attitude of an animation object to which animation parameters are set in advance and the 3D object in a virtual 3D space; a first determining step of determining whether or not the 3D object and the animation object cross each other; a second determining step of determining whether or not the animation parameters set to the animation object are already set to the 3D object, if it is determined by the processing in the first determining step that the 3D object and the animation object cross each other; a setting step of setting the animation parameters to the 3D object if it is determined by the processing in the second determining step that the animation parameters are not set to the 3D object; and a display control step of controlling the 3D object to be displayed in accordance with the animation parameters set by the processing in the setting step.

A program causing a computer to perform a process includes a designating step of designating a position and an attitude of an animation object to which animation parameters are set in advance and the 3D object in a virtual 3D space; a first determining step of determining whether or not the 3D object and the animation object cross each other; a second determining step of determining whether or not the animation parameters set to the animation object are already set to the 3D object, if it is determined by the processing in the first determining step that the 3D object and the animation object cross each other; a setting step of setting the animation parameters to the 3D object if it is determined by the processing in the second determining step that the animation parameters are not set to the 3D object; and a display control step of controlling the 3D object to be displayed in accordance with the animation parameters set by the processing in the setting step.

According to the present invention, if it is determined that the 3D object and the animation object cross each other, and if it is determined that the animation parameters set to the animation object that crosses the 3D object are not set to the 3D object, the animation parameters are set to the 3D object so that the 3D object is displayed in accordance with the animation parameters.

As described above, according to the present invention, animation parameters can be readily set to a 3D object. Furthermore, setting animation parameters of various moving images to a 3D object can be readily realized. For example, setting animation parameters of one moving image to a plurality of 3D objects and setting animation parameters of a plurality of moving images to one object can be readily achieved.

BRIEF DESCRIPTION OF THE DRAWINGS

FIG. 27 is a table for explaining properties set to an animation object; and

DESCRIPTION OF THE PREFERRED EMBODIMENTS

Figure 1:
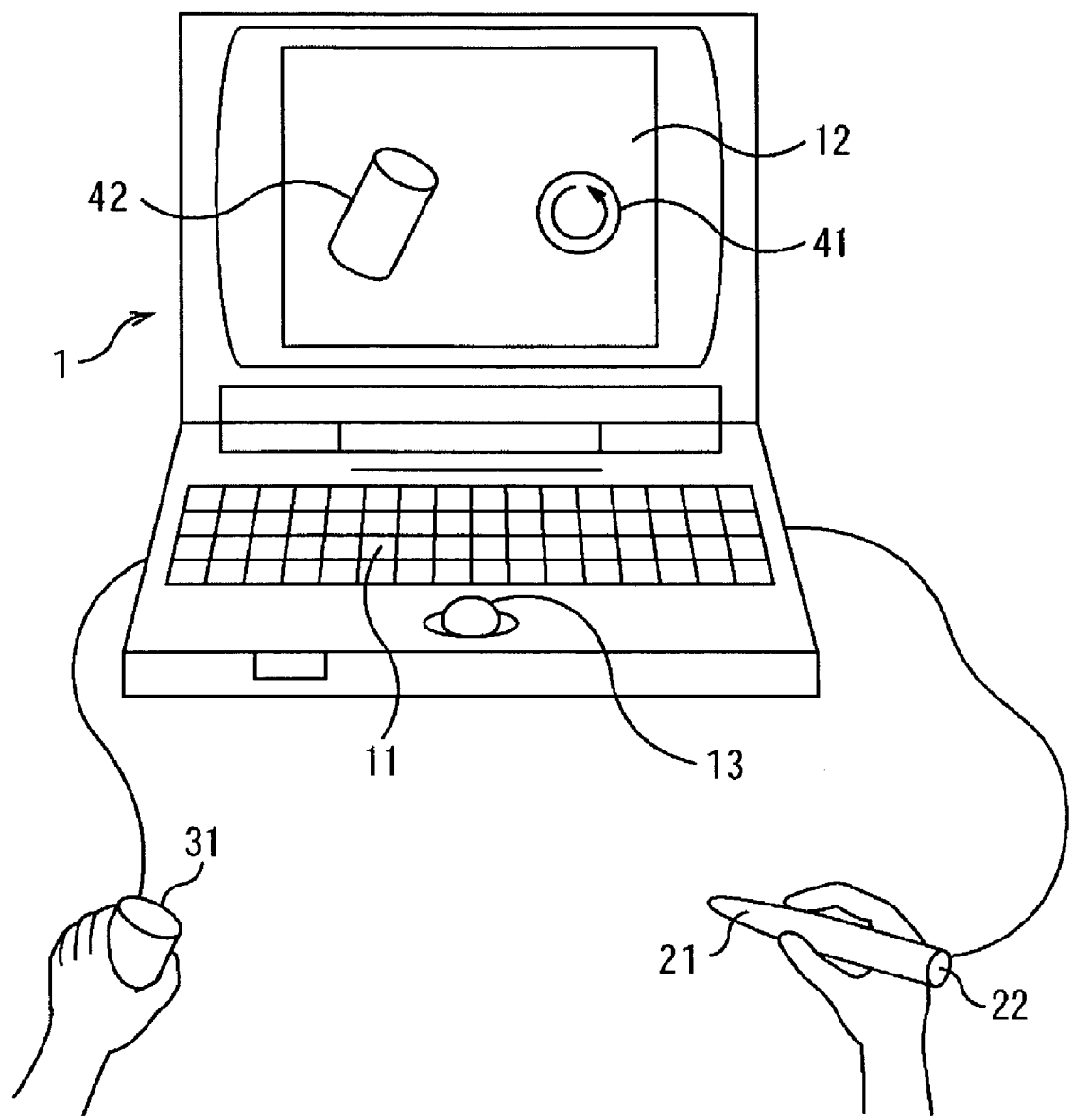
FIG. 1 is an illustration of an example of an image processing apparatus according to the present invention.

The embodiments of the present invention will be described with reference to the drawings. First, an outline of the present invention will be described with reference to the drawing. FIG. 1 is an overall view of a personal computer 1 operating as an image processing apparatus according to the present invention by executing a predetermined application program (hereinafter, described as an image processing program).

The personal computer 1 includes a display 12 for displaying a processed image or the like. The personal computer 1 is also provided with a pointer sensor 21 and a 3D object sensor 31 for detecting operations performed by a user.

For example, the pointer sensor 21 controlled by the right (may be the left) hand of the user detects a 3D movement operation of the pointer sensor 21 within a real space by using magnetism or ultrasonic waves and outputs movement signals indicating the position and angle (attitude) of the pointer sensor 21 to the personal computer 1. The position and angle of an animation object 41 within a virtual 3D space appearing on the display 12 varies with the movement signals.

The pointer sensor 21 has a trigger button 22 thereon. The pointer sensor 21 detects a pressing operation of the trigger button 22 by the user and outputs a pressing signal indicating the pressing operation to the personal computer 1. The image processing program alternately switches states between an animation-setting mode (described below) and an animation-setting releasing mode, in accordance with the pressing signal. Alternatively, a period during the pressing of the trigger button 22 may be set as an animation-setting mode and a period when the trigger button 22 is not pressed may be set as an animation-setting releasing mode in the image processing program.

Although it is desirable that the shape of the pointer sensor 21 be suggestive of the shape or texture of the corresponding animation object 41 (that is, the set moving image), the present invention is not necessarily limited to this.

For example, the 3D object sensor 31 controlled by the left (may be the right) hand of the user detects a 3D movement operation of the 3D object sensor 31 within a real space by using magnetism or ultrasonic waves and outputs movement signals indicating the position and angle of the 3D object sensor 31 to the personal computer 1. The position and angle of a 3D object 42 within a virtual 3D space appearing on the display 12 varies with the movement signals.

It is desirable that the appearance (shape and pattern) of the 3D object sensor 31 be suggestive of the appearance of the corresponding displayed 3D object 42. For example, since the 3D object 42 in FIG. 1 is cylindrical, it is desirable that the 3D object sensor 31 also be cylindrical. The present invention is, however, not necessarily limited to this.

A keyboard 11, a mouse (not shown), or a track ball 13 which are generally installed on the personal computer 1 may be used instead of the pointer sensor 21 or the 3D object sensor 31.

Although it is desirable that information on the shape and texture of the animation object 41 be suggestive of details of the moving image set to the animation object 41 in advance, the present invention is not limited to this. For example, since animation parameters of counterclockwise-rotation are set to the animation object 41, a counterclockwise arrow is added to the animation object 41 in FIG. 1.

As described above, the user operates at least one of the pointer sensor 21 and the 3D object sensor 31 within the real space so that the animation object 41 and the 3D object 42 contact (cross) each other within the virtual 3D space on the display 12. Pressing the trigger button 22 in this state by the user enables the 3D object 42 to be designated and animation parameters set to the animation object 41 to be set to the 3D object 42.

Figure 2:
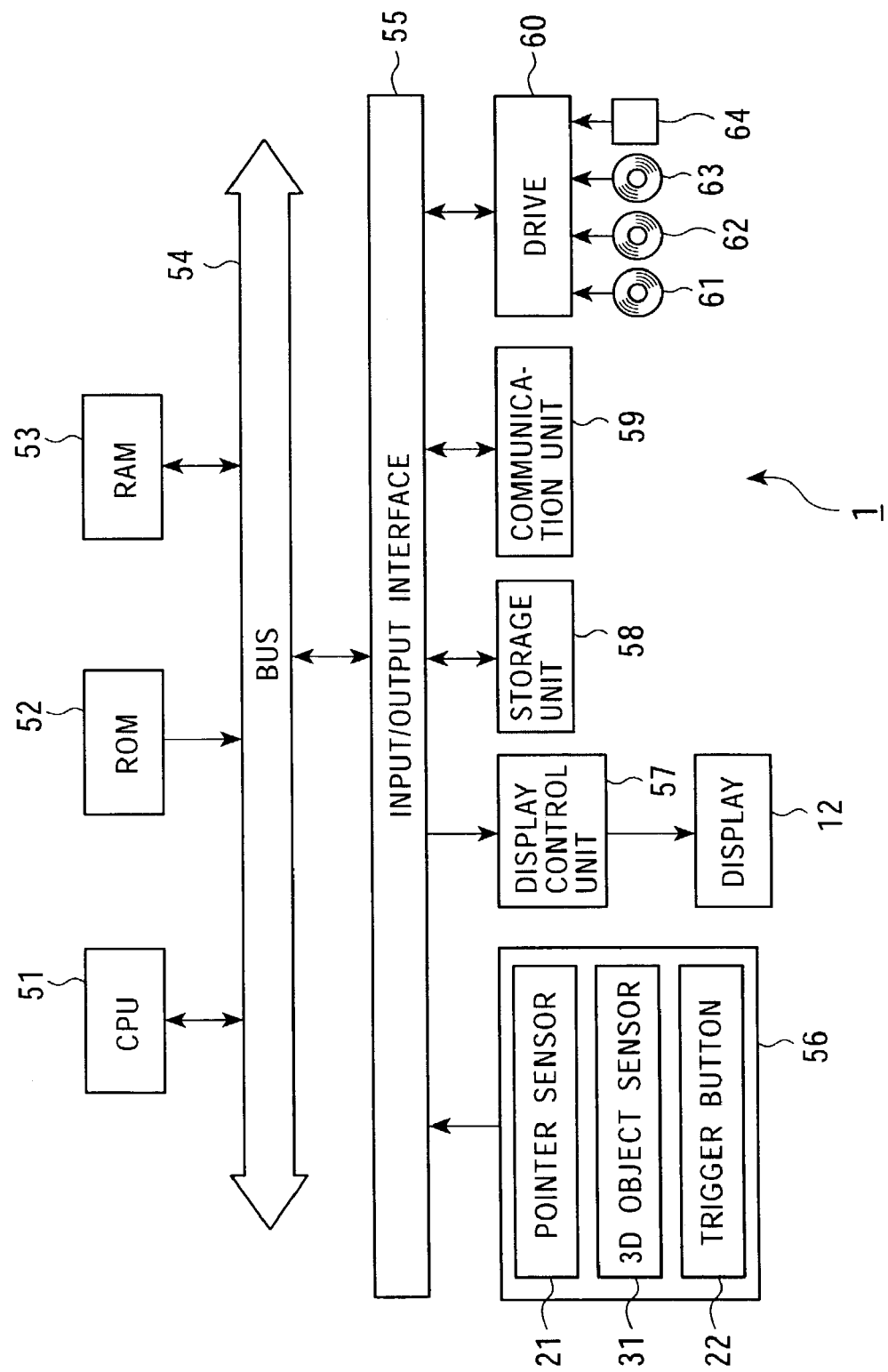
FIG. 2 is a block diagram showing an internal structure of the image processing apparatus shown in FIG. 1.

FIG. 2 shows an example of the structure of the personal computer 1. The personal computer 1 includes a central processing unit (CPU) 51. The CPU 51 is connected to an input-output interface 55 with a bus 54 therebetween. The bus 54 is connected to a read only memory (ROM) 52 and a random access memory (RAM) 53.

The input-output interface 55 is connected to an operation input unit 56 controlled by the user and to a display control unit 57 for producing a video signal displayed on the display 12. The control input unit 56 includes input devices, such as the pointer sensor 21, the 3D object sensor 31, the trigger button 22, the keyboard 11, and the trackball 13. Furthermore, the input-output interface 55 is connected to a storage unit 58 including a hard disc drive and the like for storing various types of data such as programs and 3D objects, to a communication unit 59 for communicating data via a network represented by the Internet, and to a drive 60 for reading and writing data from and to a recording medium, such as a magnetic disc 61, an optical disc 62, a magnetic optical disc 63, and a semiconductor memory 64.

The image processing program for executing an operation in the personal computer 1 as an image processing apparatus according to the present invention is stored in the magnetic disc 61 (including a floppy disc), the optical disc 62 (including a compact disc read-only memory (CD-ROM) and a digital versatile disc (DVD)), the magnetic optical disc 63 (including a mini disc (MD)), or the semiconductor memory 64 and is read through the drive 60 to be installed onto a hard disc drive housed in the storage unit 58. The image processing program installed on the storage unit 58 is loaded into the RAM 53 to be executed, in accordance with a command from the CPU 51 corresponding to a command from the control input unit 56 by the user.

An operational process performed by the image processing program in the personal computer 1 will now be described with reference to a flowchart in FIG. 3. Here, the animation object 41 and the 3D object 42 are already visible on the display 12 by a predetermined operation by the user.

In step S1, the image processing program (CPU 51) detects an operation of the pointer sensor 21 and the 3D object sensor 31 by the user in accordance with a signal from the control input unit 56.

In step S2, the image processing program changes (or moves) the position and angle (or attitude) of the animation object 41 or the 3D object 42 within the virtual 3D space on the display 12, in accordance with the operation of the pointer sensor 21 or the 3D object sensor 31 by the user.

In step S3, the image processing program determines whether or not the user switches on the trigger button 22. If it is determined that the trigger button 22 is operated, an animation-setting mode is set, and the process proceeds to step S4.

In step S4, the image processing program determines whether or not the 3D object 42 and the animation object 41 cross each other, in other words, whether or not at least part of them overlap each other. If it is determined that the 3D object 42 and the animation object 41 cross each other, the process proceeds to step S5. If it is determined that the 3D object 42 and the animation object 41 do not cross each other, the process proceeds to step S10.

A method for determining whether or not the 3D object 42 and the animation object 41 cross each other depends on the structure of the 3D object 42 and the animation object 41. For example, for the 3D object 42 and the animation object 41 that are geometrically expressed, the determination can be performed by geometrical calculation. For example, for the 3D object 42 and the animation object 41 that are expressed by spheres, if a distance between the central positions of the objects is shorter than the length obtained by adding the radius of each of the objects, it is determined that the 3D object 42 and the animation object 41 cross each other. For the 3D object 42 and the animation object 41 that are expressed by polygon-mesh models, a method for determining whether or not mesh models cross each other can be used. The details of the method for determining whether or not mesh models cross each other is disclosed by, J. T. Klosowski, M. Held, J. S. B. Mitchell, H. Sowizr-al, and K. Zikan, entitled "Efficient Collision Detection Using Bounding Volume Hierarchies of k-DOPs" (IEEE Transactions on Visualization and Computer Graphics 4(1): 21–36, 1998).

In step S5, the image processing program determines whether or not a combination flag, which indicates that the animation object 41 and the 3D object 42 are combined together, of the 3D object 42 that crosses the animation object 41 is switched on. If it is determined that the combination flag is switched off, the process proceeds to step S6.

In step S6, the image processing program switches on the combination flag. That is, the connection relationship between the objects is maintained. Also, the structure of the objects may be completely combined. For example, polygon-mesh objects can be integrated into one polygon-mesh model by mesh rearrangement.

At this time, it is preferable that a display enable the user to recognize that the animation object 41 is combined with the 3D object 42. For example, if the animation object 41 disposed away from the 3D object 42, as shown in part A of FIG. 4, moves to a place where the animation object 41 crosses the 3D object 42, as shown in part B of FIG. 4, the animation object 41 is transparently displayed. Accordingly, the state in which the animation object 41 is combined with the 3D object 42 is displayed.

Figure 4:
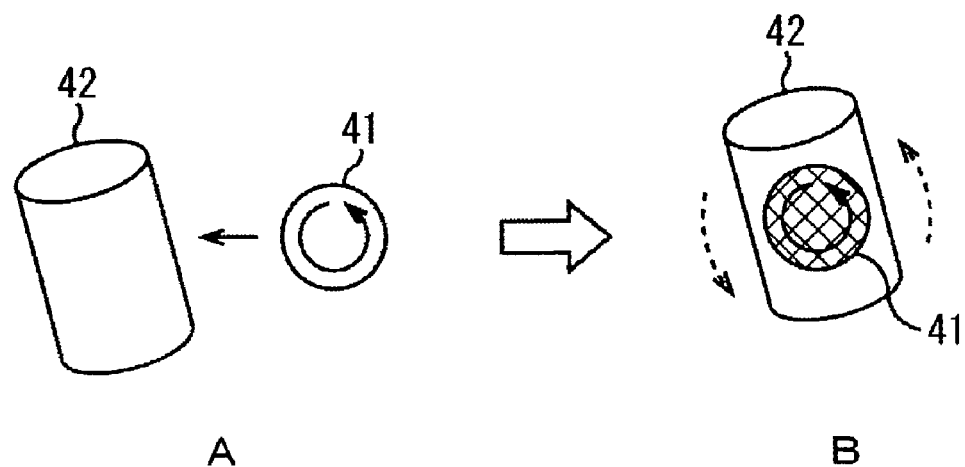
FIG. 4 includes illustrations of an example of combination of a 3D object and an animation object.

The state in which the animation object 41 is completely contained in the 3D object 42, as shown in part B of FIG. 4, may be regarded as the state in which they cross each other. A state in which part of the animation object 41 is disposed outside the 3D object 42, as shown in part B of FIG. 5, may also be regarded as the state in which they cross each other.

In step S7, the image processing program sets animation parameters set to the animation object 41 to the 3D object 42. In the cases shown in FIGS. 4 and 5, since animation parameters of counterclockwise rotation are set to (correspond to) the animation object 41, animation parameters of the counterclockwise rotation are set to the 3D object 42.

In step S10, the image processing program produces image data for displaying the 3D object 42 as a moving image, in accordance with the animation parameters set to the 3D object 42.

In step S11, the image processing program renders the image data produced in step S11 on memory installed in the display control unit 57.

In step S12, the image processing program controls the display control unit 57, reads the rendered image data, and outputs it to the display 12 in FIG. 1 to display it. Accordingly, the 3D object 42 is displayed as a moving image. For example, the 3D object 42 in FIGS. 4 and 5 rotates counterclockwise. Then, the process proceeds to step S13.

If it is determined that the combination flag is switched on in step S5, the image processing program determines that the 3D object 42 and the animation object 41 are combined together. Then, the process proceeds to step S8.

Figure 6:
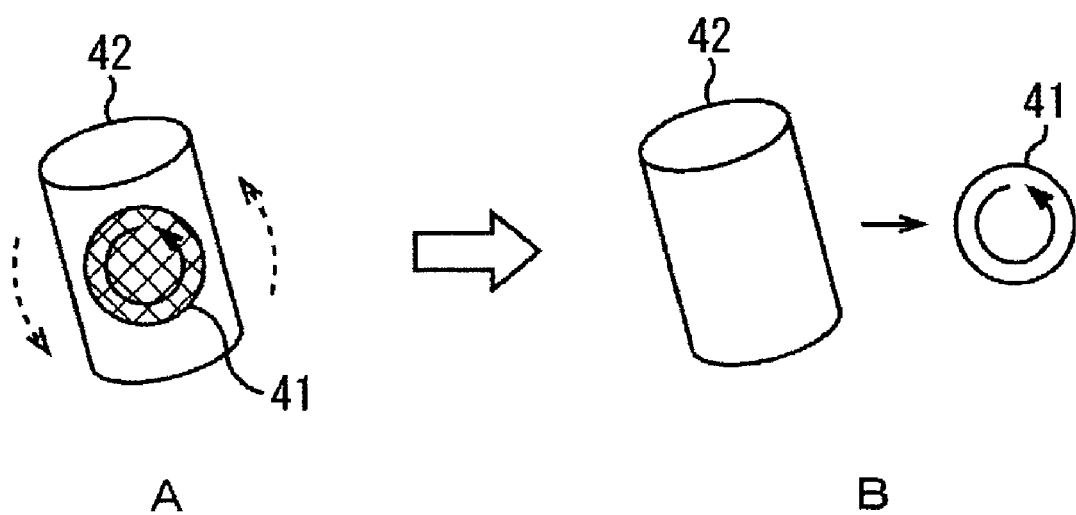
FIG. 6 includes illustrations of an example of separation of the 3D object and the animation object.

In step S8, the image processing program switches off the combination flag to separate the animation object 41 from the 3D object 42. In other words, the state in which the 3D object 42 and the animation object 41 are combined together, as shown in part A of FIG. 6, is released and the combined objects are separated from each other, as shown in part B of FIG. 6.

In step S9, the image processing program sets parameters of a still image to the 3D object 42. That is, the animation parameters set in step S7 are deleted. Then, processing in steps S10 to S12 are performed, and displaying the 3D object 42 as a moving image is stopped. Then, the process proceeds to step S13.

In step S13, the image processing program determines whether or not to terminate the process, on the basis of whether or not predetermined termination conditions are satisfied. The predetermined termination conditions indicates, for example, constraint conditions of software or hardware, such as a case in which the user inputs a quit command and a case in which memory (the RAM 53) is insufficient.

If it is determined that the predetermined termination conditions are satisfied, the process is terminated. If it is determined that the predetermined termination conditions are not satisfied, it is determined that the process should not be terminated. The process returns to step S1 to repeat the subsequent steps. In other words, the image processing program performs the process for displaying the 3D object 42 as a moving image, in accordance with further operation by the user.

If it is determined that the trigger button 22 is not operated in step S3, the image processing program does not set an animation-setting mode. The process skips steps S4 to S9 to proceed to step S10.

If the image processing program determines that the 3D object 42 and the animation object 41 do not cross each other in step S4, it is determined that the trigger input is of no use. The process skips steps S5 to S7 to proceed to step S10.

Figure 3:
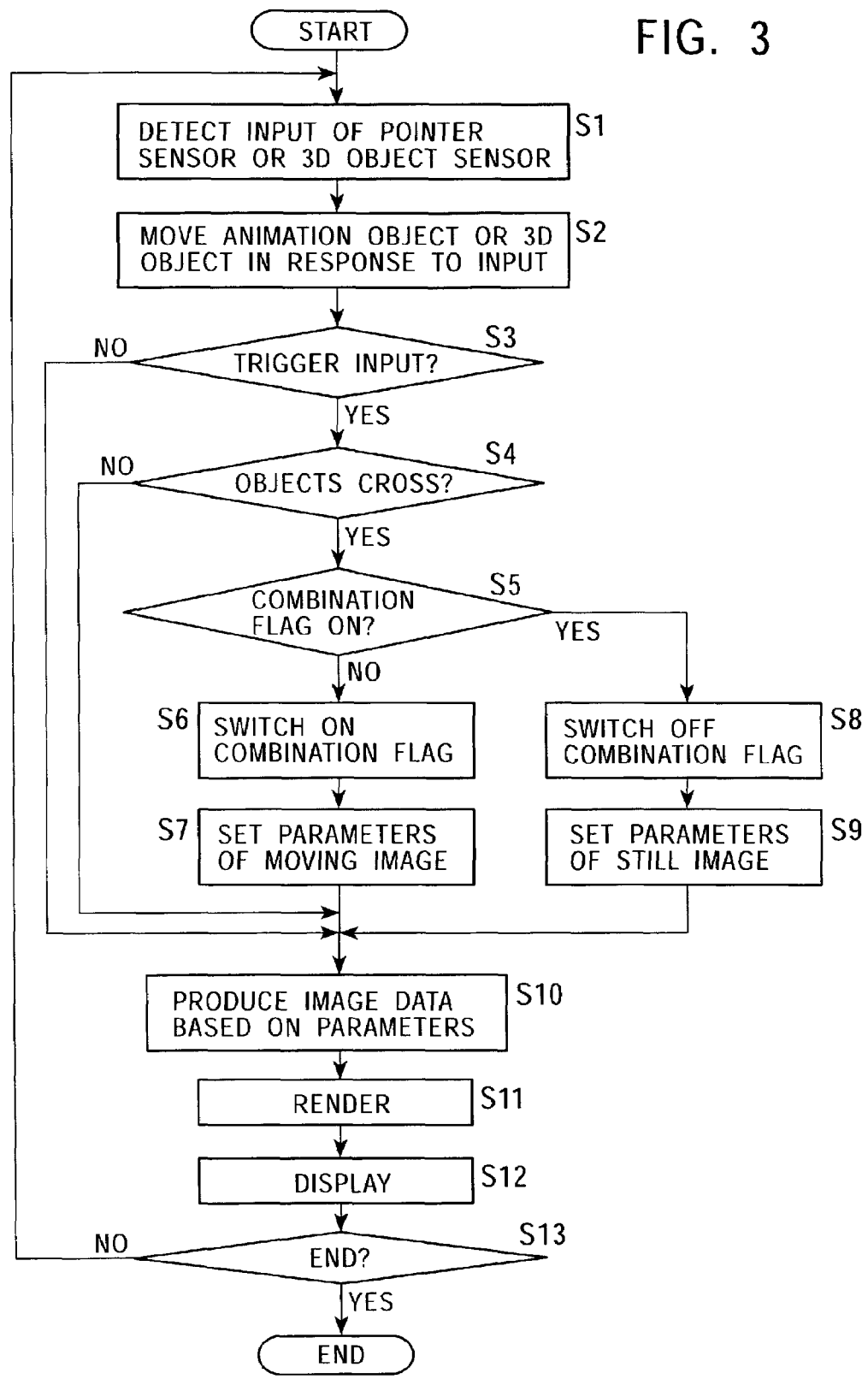
FIG. 3 is a flowchart for explaining an operation of the image processing apparatus shown in FIG. 1.
Figure 5:
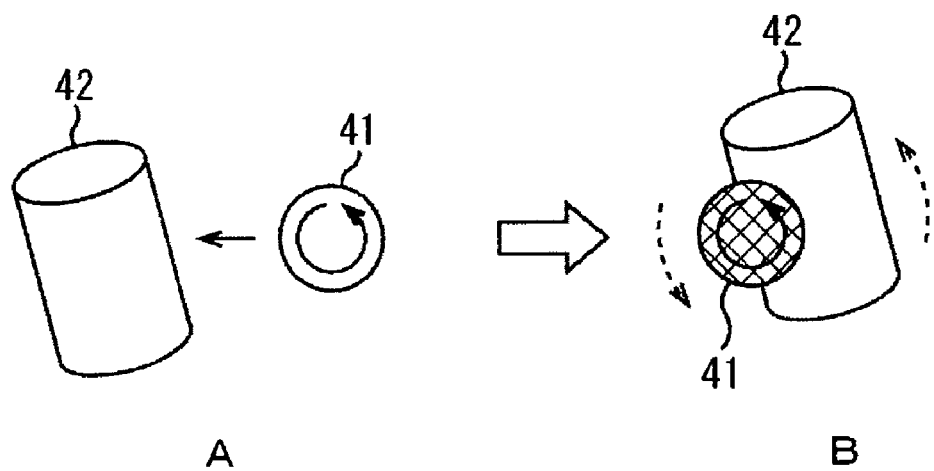
FIG. 5 includes illustrations of another example of the combination of the 3D object and the animation object.

As shown in the flowchart in FIG. 3, combining the 3D object 42 and the animation object 41 together, as shown in FIGS. 4 and 5, enables animation parameters to be readily set to the 3D object 42, thus enabling the animation operation to be performed on the 3D object 42.

The process in FIG. 3 is performed for each animation object. If a 3D object crosses each of a plurality of animation objects, the 3D object is combined with each of the animation object and the combined animation operation is performed on the 3D object. The combination between the 3D object and each of the plurality of animation objects is individually released.

In the example shown in FIG. 1, two 3D sensors for operating a 3D object and for operating an animation object are provided. However, only one sensor for operating an animation object may be provided, as shown in FIG. 7, and only one sensor for operating a 3D object may be provided, as shown in FIG. 8.

Figure 7:
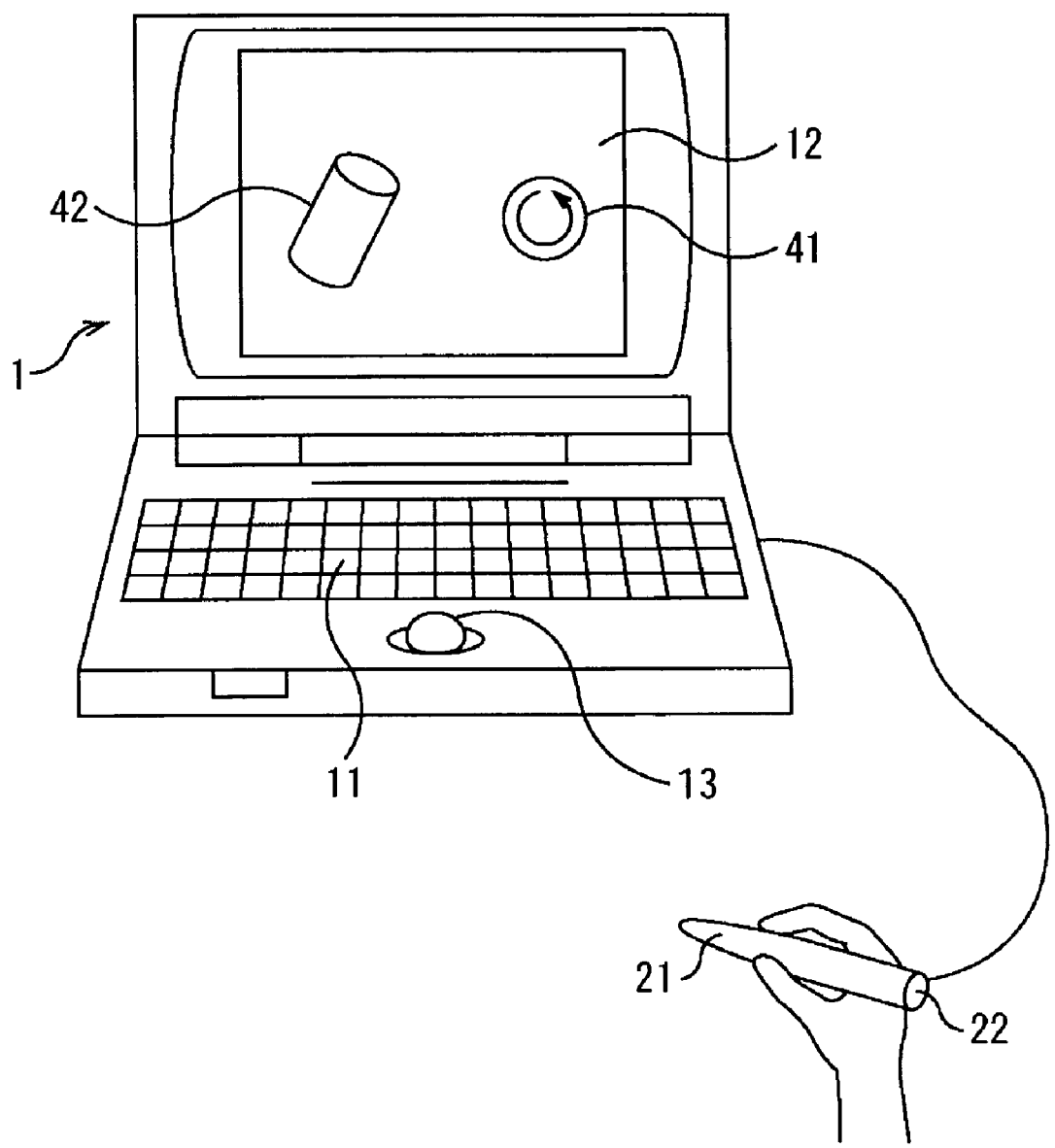
FIG. 7 is an illustration of another example of the image processing apparatus according to the present invention.
Figure 8:
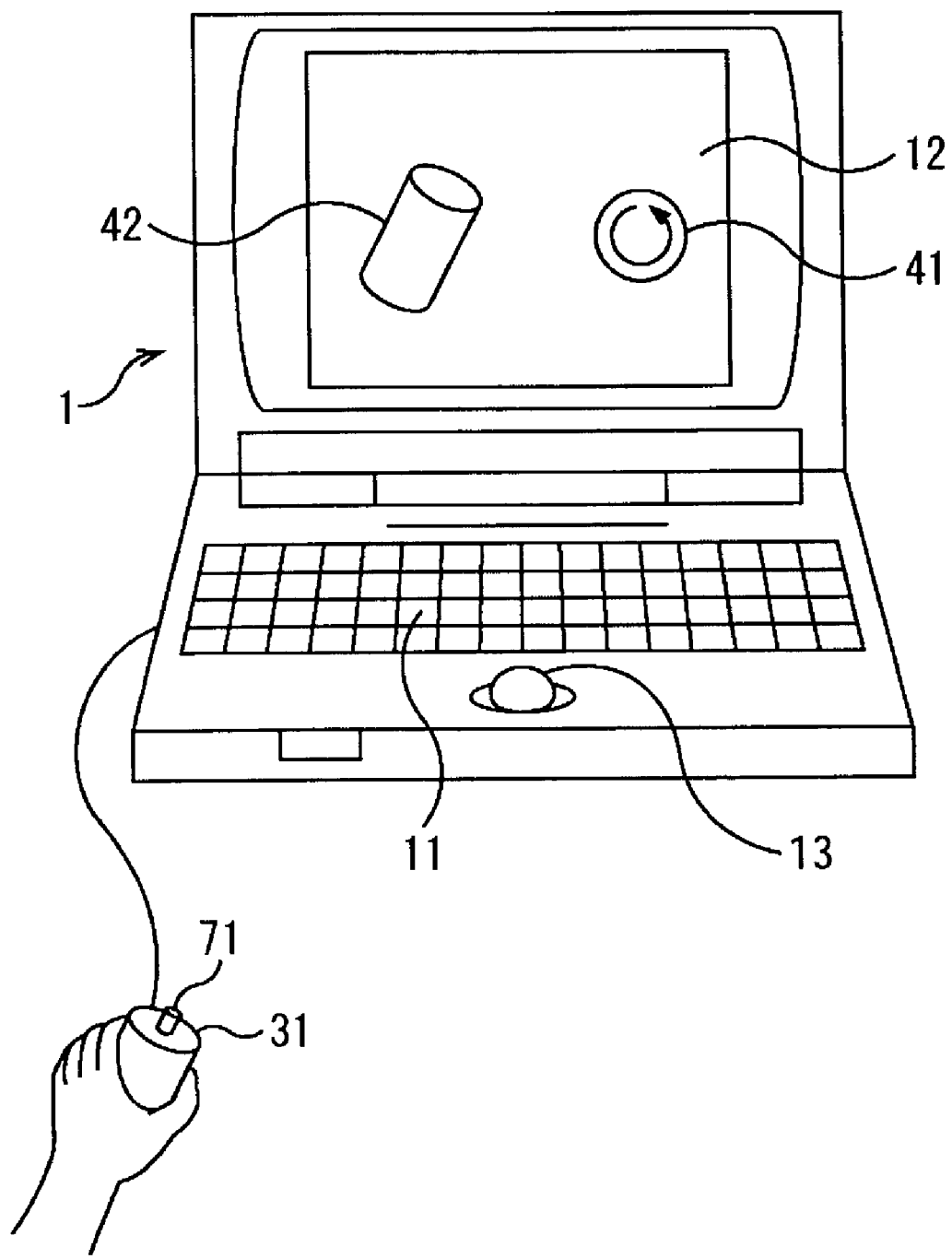
FIG. 8 is an illustration of still another example of the image processing apparatus according to the present invention.
Figure 9:
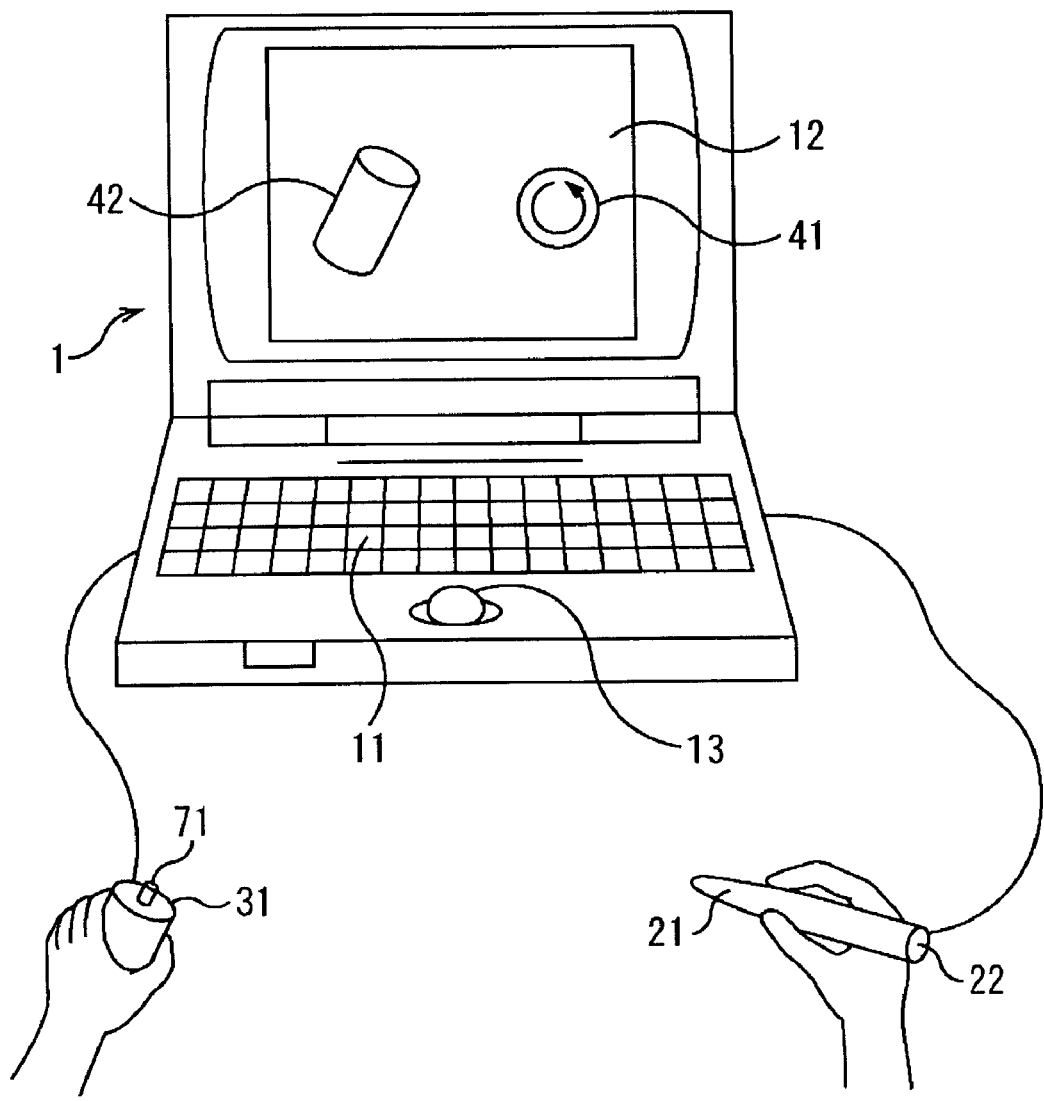
FIG. 9 is an illustration of still another example of the image processing apparatus according to the present invention.

The trigger button 22 is provided on the pointer sensor 21 in the example shown in FIG. 7, and a trigger button 71 is provided on the 3D object sensor 31 in the example shown in FIG. 8. If a plurality of 3D sensors is used, as shown in FIGS. 1 and 9, a trigger button may be provided on at least one of the plurality of 3D sensors. Alternatively, an input device such as a button for switching on/off (for example, a key on a keyboard) may be provided instead of the trigger button provided on the sensor.

Figure 10:
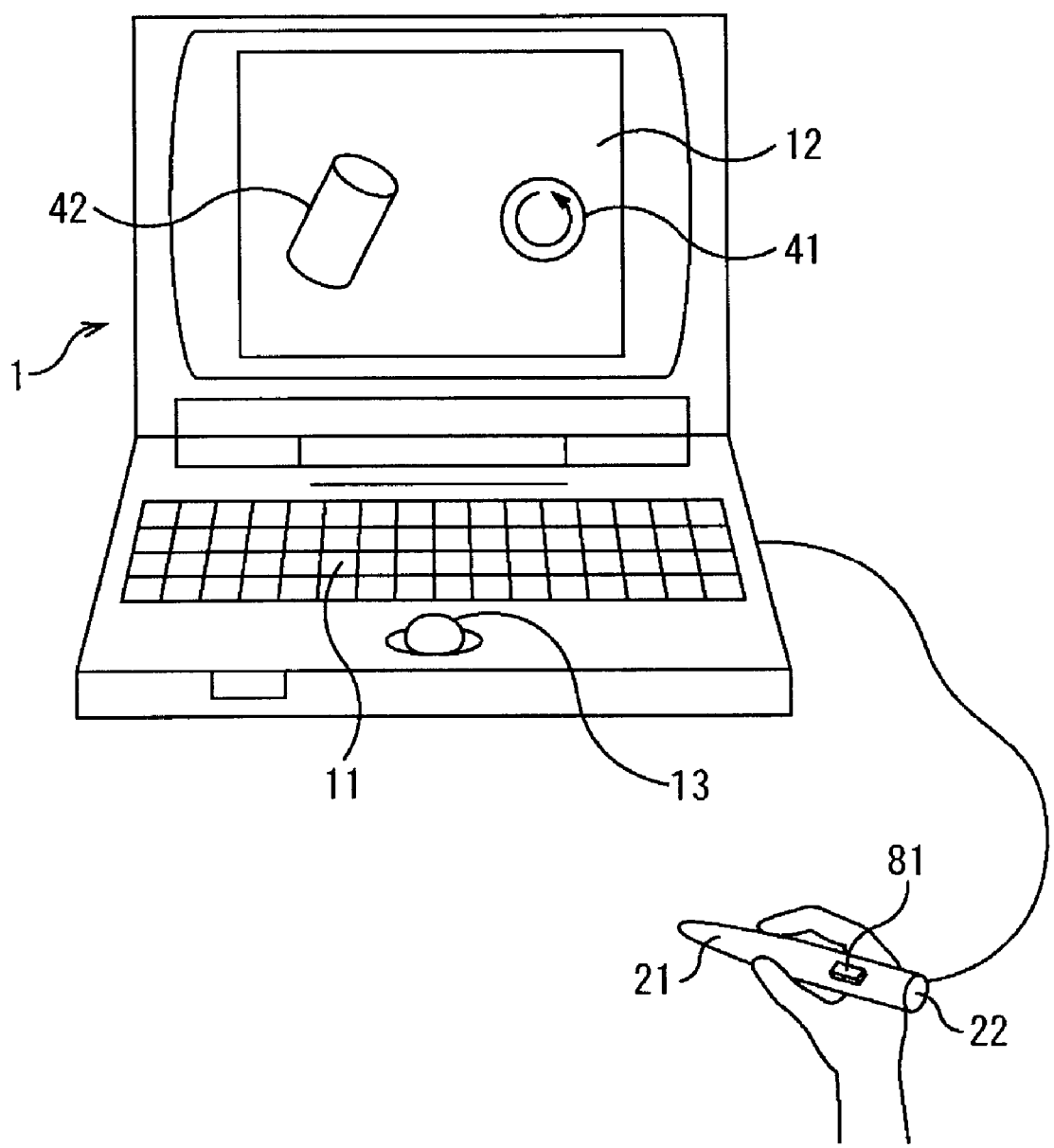
FIG. 10 is an illustration of still another example of the image processing apparatus according to the present invention.

An object to be operated does not necessarily need a 3D sensor for operating it. For a plurality of objects to be operated, by operating the trigger button on the input device, the correspondence between the 3D sensor and each of the objects to be operated can be selected, thus selecting a 3D object to be operated as necessary. For example, in an arrangement shown in FIG. 10, by operating a switchable trigger button 81 provided on the 3D sensor in addition to the trigger button 22, an object to be operated can be selected.

In any case, a two-dimensional input device, such as a mouse or a tablet, or a plurality of on/off input units, such as keys on a keyboard, may be substituted for a 3D sensor.

An example in which combining and separating different types of animation objects with and from one 3D object enables animation parameters of various moving images to be readily set to the 3D object will now be described with reference to FIG. 11.

Figure 11:
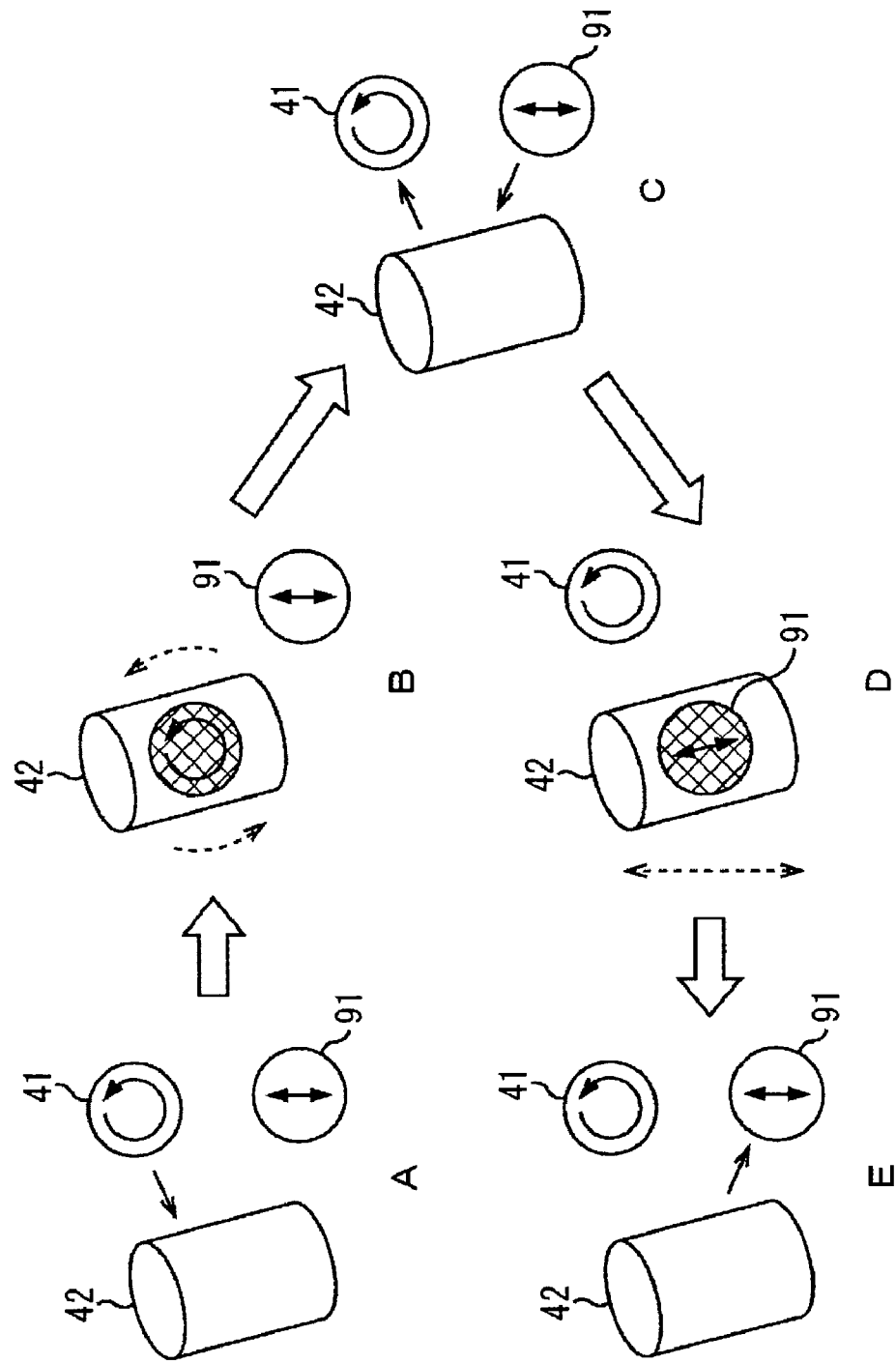
FIG. 11 includes illustrations of an example in which animation parameters of different types of moving images are set to one 3D object.

Combining the counterclockwise-rotating animation object 41 with the 3D object 42, as shown in part A of FIG. 11, allows the 3D object 42 to initiate an animation operation based on animation parameters of counterclockwise rotation which are set to the animation object 41, as shown in part B of FIG. 11. Then, separating the combined counterclockwise-rotating animation object 41 from the 3D object 42 and combining a vertical-reciprocating animation object 91 with the 3D object 42, as shown in part C of FIG. 11, allows the 3D object 42 to initiate an animation operation based on animation parameters of vertical reciprocation which are set to the vertical-reciprocating animation object 91, as shown in part D of FIG. 11. Then, as shown in part E of FIG. 11, separating the combined vertical-reciprocating animation object 91 from the 3D object 42 allows the 3D object 42 to stop the animation operation based on the animation parameters of the vertical reciprocation.

Figure 12:
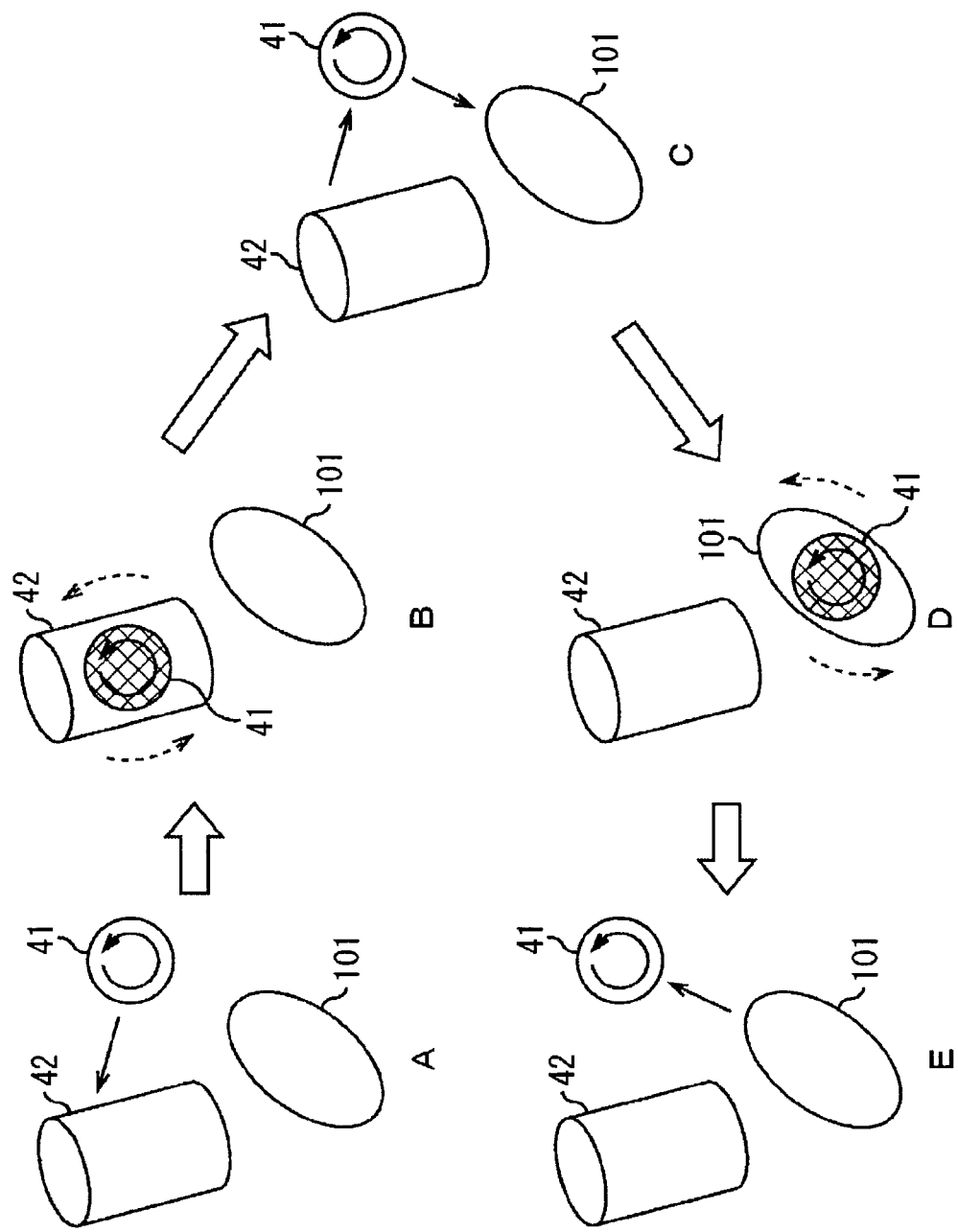
FIG. 12 includes illustrations of an example in which animation parameters of one moving image are set to different types of 3D objects.

FIG. 12 shows an example in which one animation object is combined with and separated from a plurality of 3D objects.

Combining the counterclockwise-rotating animation object 41 with the 3D objects 42, as shown in part A of FIG. 12, allows the combined 3D object 42 to initiate an animation operation based on animation parameters of counterclockwise rotation which are set to the counterclockwise-rotating animation object 41, as shown in part B of FIG. 12. Then, separating the combined counterclockwise-rotating animation object 41 from the 3D object 42 and combining the counterclockwise-rotating animation object 41 with a 3D object 101, as shown in part C of FIG. 12, allows the combined 3D object 101 to initiate the animation operation based on the animation parameters of the counterclockwise rotation which are set to the counterclockwise-rotating animation object 41, as shown in part D of FIG. 12. Then, separating the combined counterclockwise-rotating animation object 41 from the 3D object 101 allows the 3D object 101 to stop the animation operation based on the animation parameters of the counterclockwise rotation, as shown in part E of FIG. 12.

Figure 13:
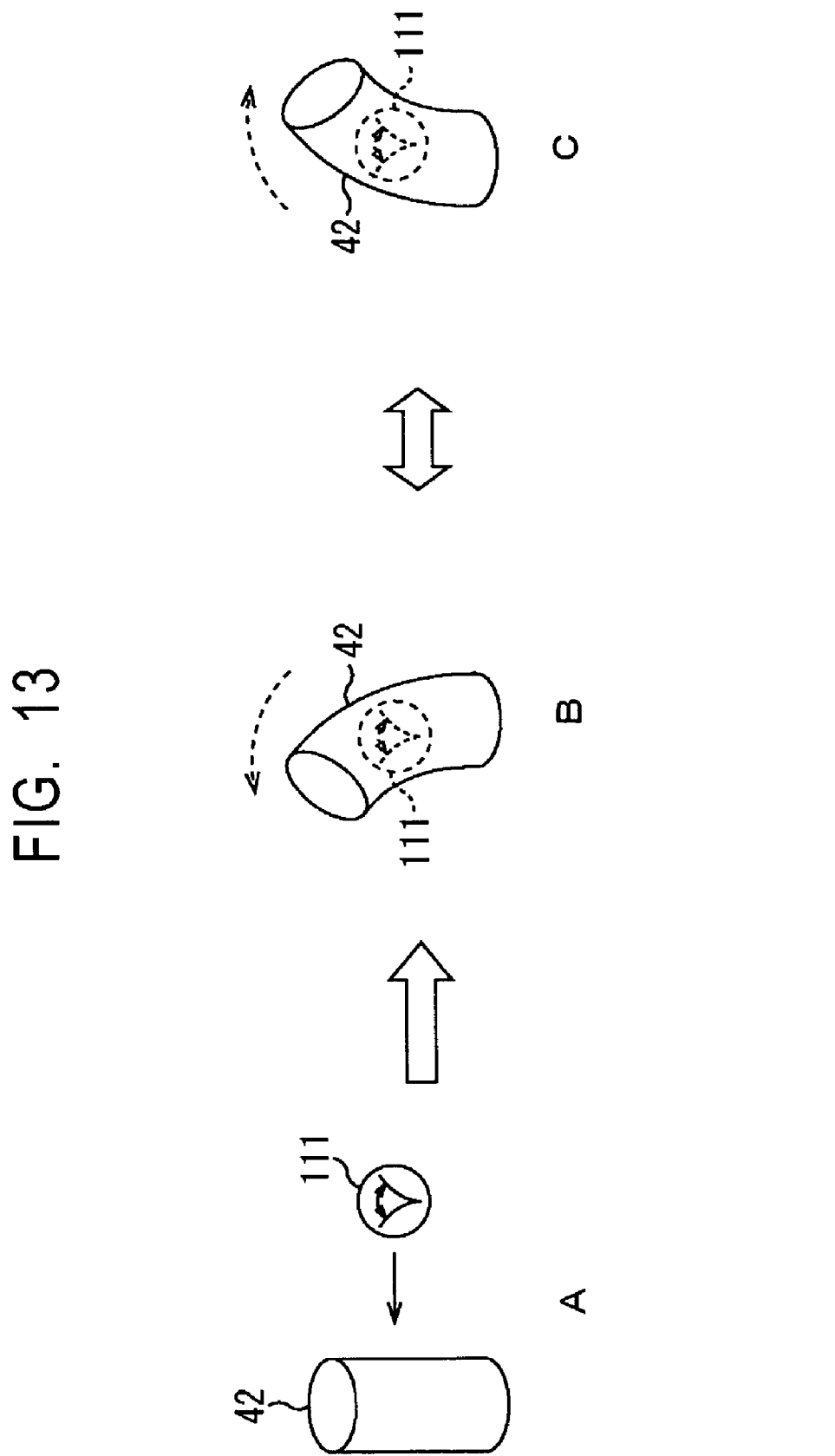
FIG. 13 includes illustrations of an example of combination of a 3D object and a deflection animation object.

Animation parameters of any moving image may be set to an animation object that is combined with a 3D object. FIG. 13 shows an example of a deflection moving image in which the 3D object 42 is bent to a certain direction and released and is bent to an opposite direction and released by free form deformation (FFD) whose parameter varies with time.

Figure 14:
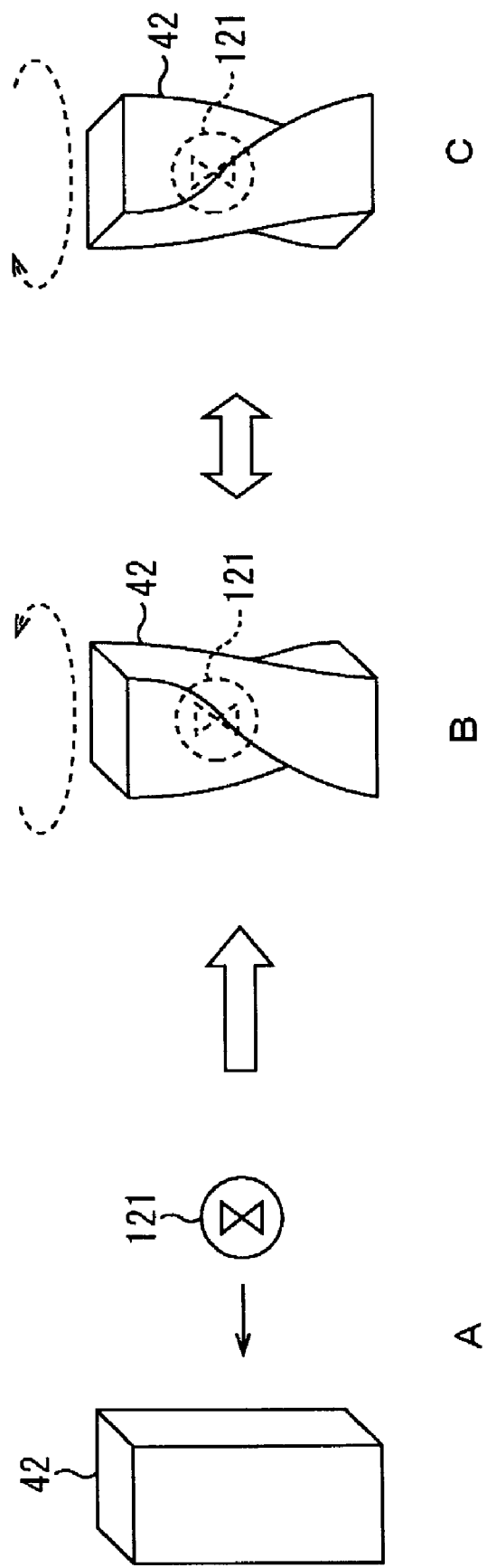
FIG. 14 includes illustrations of an example of combination of a 3D object and a twist animation object.

FIG. 14 shows an example of a twist moving image in which a direction of rotation of the 3D object 42 varies similarly to washing machines by FFD, as in FIG. 13.

Figure 15:
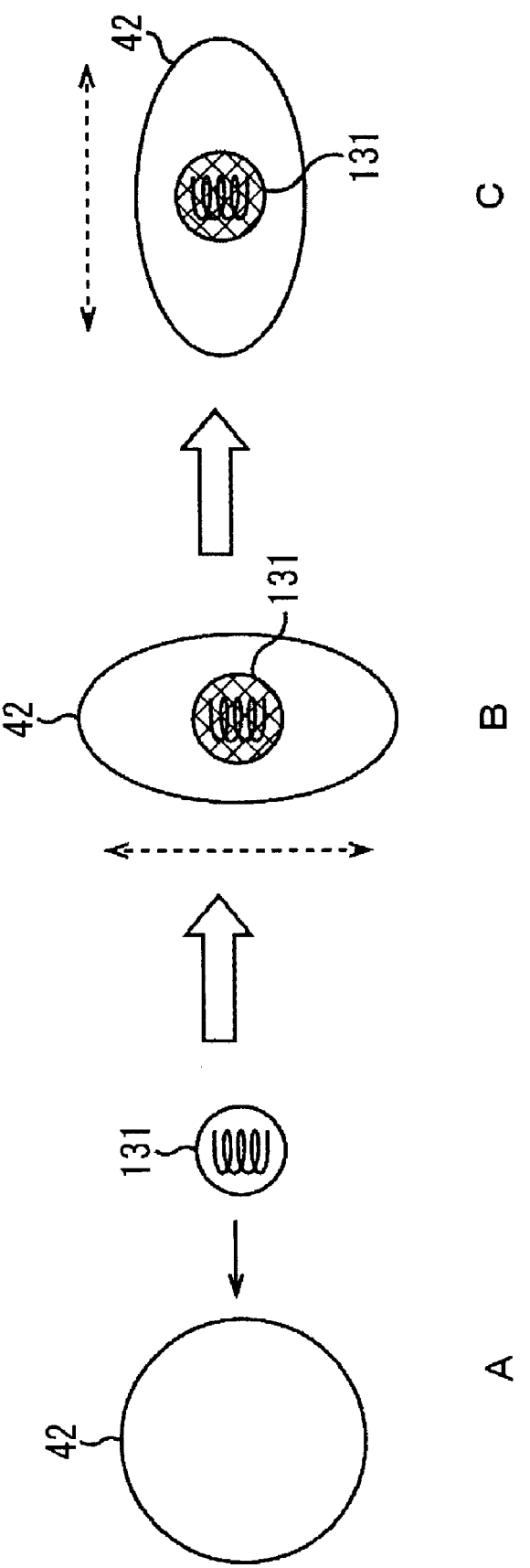
FIG. 15 includes illustrations of an example of combination of a 3D object and a stretch animation object.

FIG. 15 is an example of a stretch moving image in which the entire 3D object 42 is expanded and contracted like rubber by FFD, as in FIG. 13.

In any case, combining a deflection animation object 111, a twist animation object 121, or a stretch animation object 131 with the 3D object 42 allows the 3D object 42 to realize the corresponding animation operation.

A second embodiment of the present invention in which an animation object is combined with one of a plurality of 3D objects combined together will now be described with reference to FIGS. 16 to 18.

Figure 16:
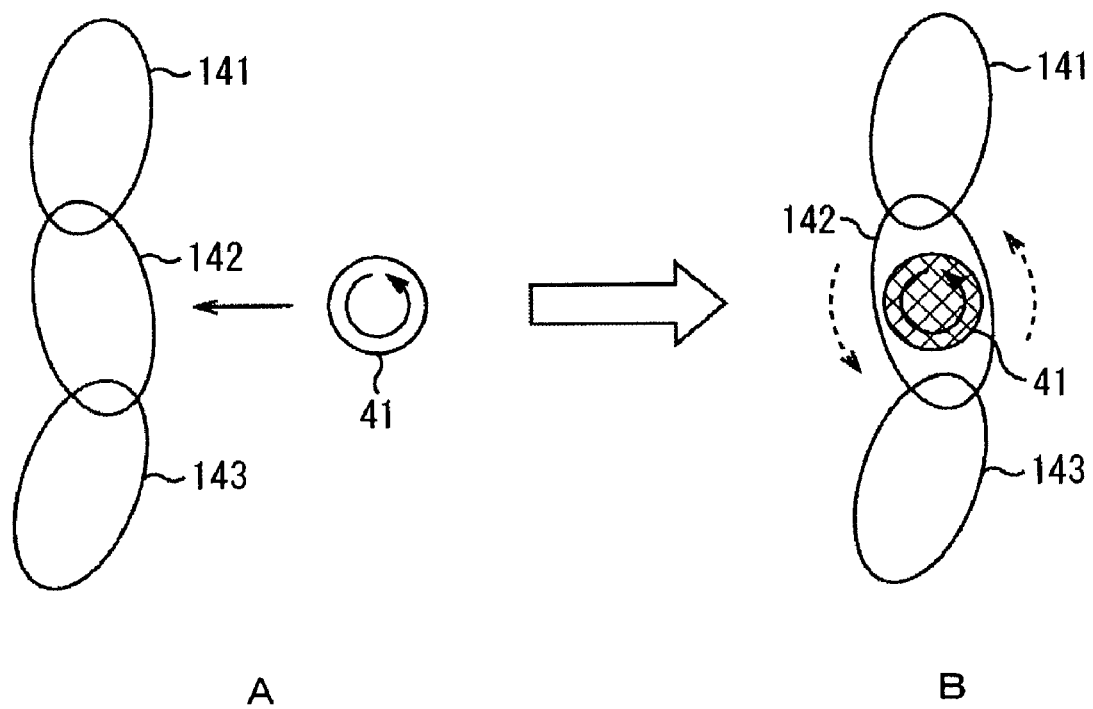
FIG. 16 includes illustrations of an example in which animation parameters of an animation object are set to a plurality of 3D objects combined together.

Referring to part A of FIG. 16, a 3D object 142 is combined with a 3D object 141, and the 3D object 142 is also combined with a 3D object 143. The three 3D objects 141, 142, and 143 are ordered beforehand in the order of the 3D object 141, the 3D object 142, and the 3D object 143. The system configuration and a flowchart of the second embodiment are the same as in the first embodiment.

Combining the animation object 41 with the 3D object 142, as shown in part A of FIG. 16, allows animation parameters of counterclockwise rotation that are set to the counterclockwise-rotating animation object 41 to be set only to the 3D object 142, as shown in part B of FIG. 16, as in the first embodiment. In this case, the animation operation based on the animation parameters of the counterclockwise rotation is performed only on the 3D object 142 that is combined with the animation object 41. In other words, sequence (order) is meaningless in this example.

Figure 17:
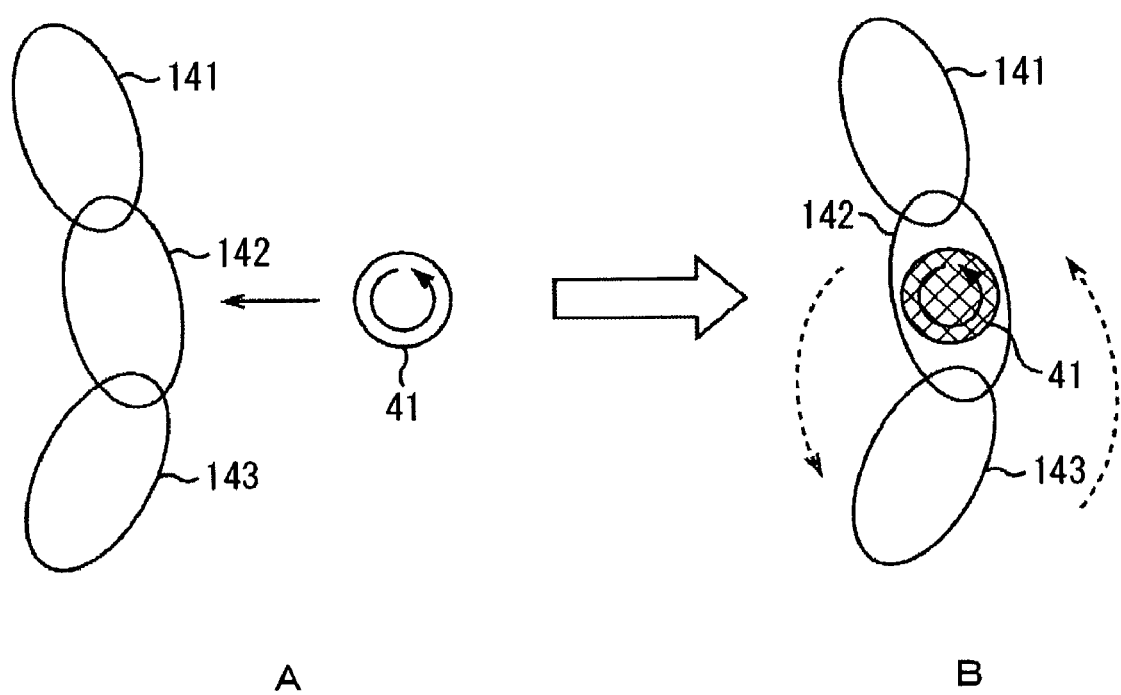
FIG. 17 includes illustrations of another example in which animation parameters of the animation object are set to the plurality of 3D objects combined together.

FIG. 17 shows an example in which the animation parameters of the counterclockwise rotation are set to all the 3D objects that are in lower orders of the 3D object 142 combined with the counterclockwise-rotating animation object 41. In the case shown in part B of FIG. 17, the animation parameters of the counterclockwise rotation are set to the 3D object 142, and the 3D object 143, which is in a lower order of the 3D object 142, is animated following the animation parameters of the counterclockwise rotation set to the 3D object 142. In other words, the 3D object 142 rotates counterclockwise around the midpoint of the counterclockwise-rotating animation object 41, and the 3D object 143 rotates counterclockwise following this. At this time, the relative positional relationship between the 3D object 142 and the 3D object 143 does not change.

Animation parameters may be set to a 3D object in higher order. In this case, the 3D object 141 is animated following the animation parameters of the counterclockwise rotation set to the 3D object 142.

Figure 18:
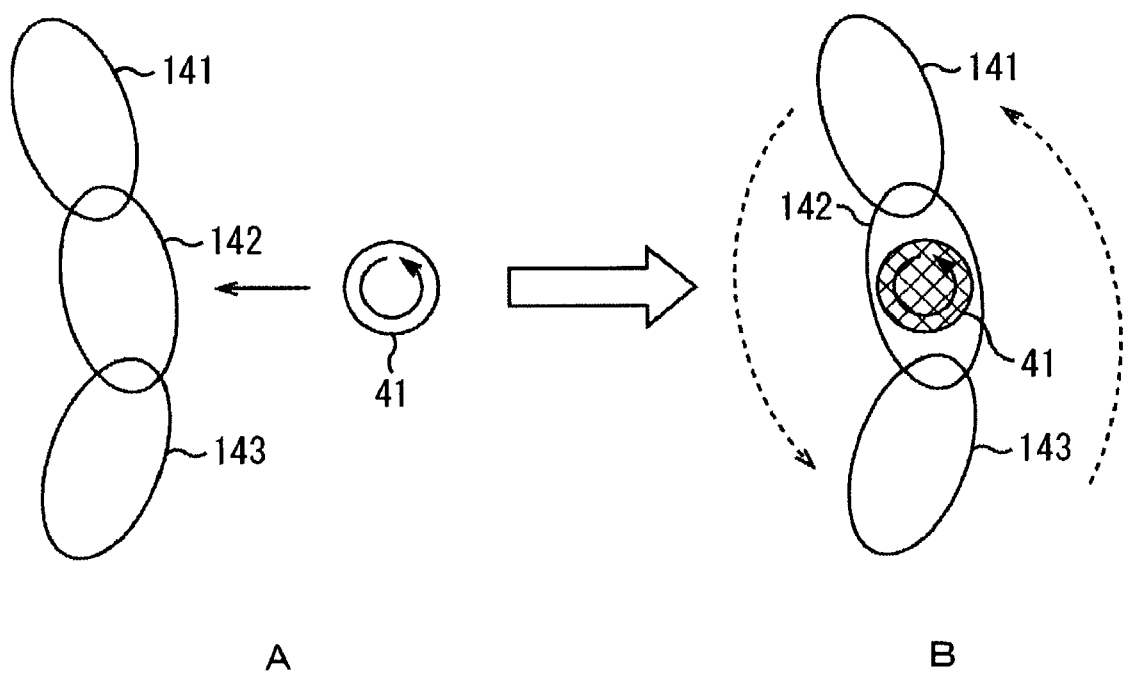
FIG. 18 includes illustrations of still another example in which animation parameters of the animation object are set to the plurality of 3D objects combined together.

FIG. 18 shows an example in which an animation operation is performed on all the combined 3D objects. Whether or not the 3D objects are ordered is not considered in this case. As in the case in which the 3D object 143 follows the animation parameters set to the 3D object 142 in FIG. 17, the 3D objects 141 and 143 follow the animation parameters of the counterclockwise rotation set to the 3D object 142 if all the objects are animated. As shown in part B in FIG. 18, the animation operation based on the animation parameters of the counterclockwise rotation around the 3D object 142 is performed on all the combined 3D objects.

A third embodiment of the present invention in which combining different types of animation objects with one 3D object allows animation operations based on animation parameters set to the different types of animation objects to be simultaneously or sequentially performed on the 3D object will now be described with reference to FIGS. 19 and 20. The system configuration and a flowchart in the third embodiment are the same as in the first embodiment.

Figure 19:
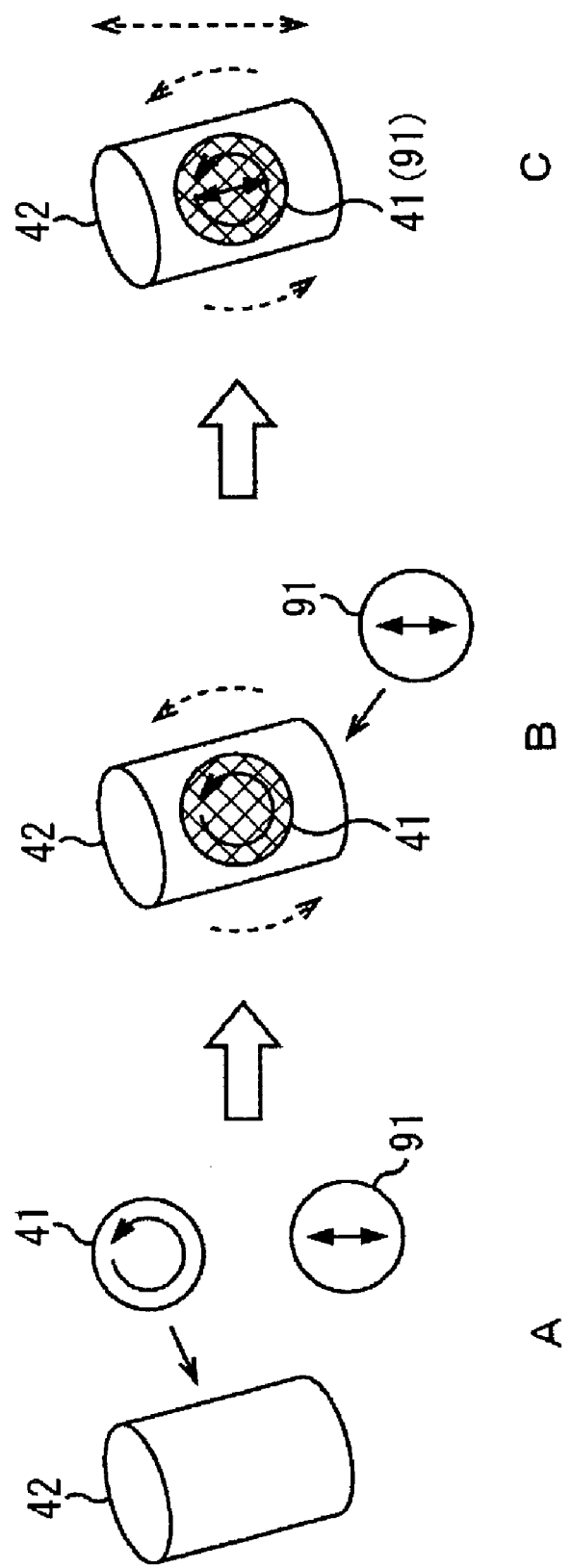
FIG. 19 includes illustrations of an example in which animation parameters of animation objects are set so that the animation operations are performed simultaneously.

In an example shown in FIG. 19, one 3D object is set so that an animation operation based on animation parameters of counterclockwise rotation and an animation operation based on animation parameters of vertical reciprocation are performed on the 3D object at the same time. In this case, the animation parameters are set in advance so that the animation operations are simultaneously performed.

Combining the counterclockwise-rotating animation object 41 with the 3D object 42, as shown in part A of FIG. 19, allows the 3D object 42 to initiate an animation operation based on animation parameters of counterclockwise rotation, as shown in part B of FIG. 19. Then, combining the vertical-reciprocating animation object 91 with the 3D object 42, as shown in part B of FIG. 19, allows animation parameters set to the vertical-reciprocating animation object 91 to be set to the 3D object 42. Thus, the animation operation based on the animation parameters of the counterclockwise rotation and the animation operation based on the animation parameters of the vertical reciprocation are performed on the 3D object 42 at the same time, as shown in part C of FIG. 19.

Figure 20:
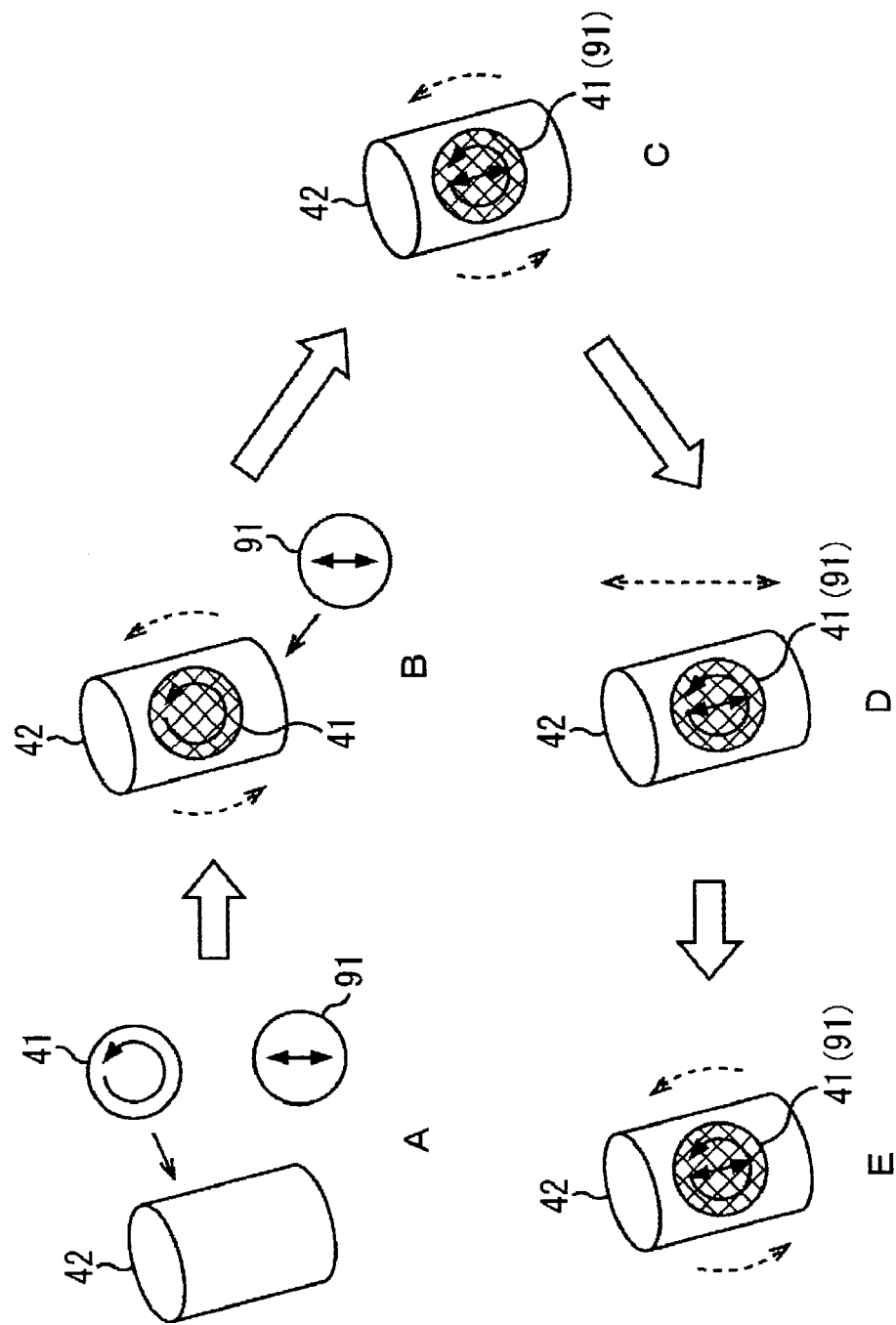
FIG. 20 includes illustration of an example in which animation parameters of the animation objects are set so that the animation operations are performed sequentially.

In an example shown in FIG. 20, one 3D object is set so that an animation operation based on animation parameters of counterclockwise rotation and an animation operation based on animation parameters of vertical reciprocation are sequentially performed on the 3D object. In this case, the animation parameters are set in advance so that the animation operations are performed sequentially. For example, a predetermined length (time) of animation operation is set to each animation object. When the animation operation is terminated after the predetermined time, if other animation parameters are set, an animation operation based on the other animation parameters is performed on each of the animation objects. If other animation parameters are not set, the same animation operation is repeated.

Combining the counterclockwise-rotating animation object 41 with the 3D object 42, as shown in part A of FIG. 20, allows the 3D object 42 to initiate an animation operation based on the animation parameters of the counterclockwise rotation. Then, combining the vertical-reciprocating animation object 91 with the 3D object 42, as shown in part B of FIG. 20, allows the animation parameters set to the vertical-reciprocating animation object 91 to be set to the 3D object 42, as shown in part C of FIG. 20. Then, after performing the animation operation based on the animation parameters of the counterclockwise rotation for a predetermined period of time, the 3D object 42 initiates the animation operation based on the animation parameters of the vertical reciprocation, as shown in part D of FIG. 20. After performing the animation operation based on the animation parameters of the vertical reciprocation for a predetermined period of time, the 3D object 42 initiates the animation operation based on the animation parameters of the counterclockwise rotation again, as shown in part E of FIG. 20. Therefore, the 3D object 42 performs the animation operation based on the animation parameters of the counterclockwise rotation and the animation operation based on the animation parameters of the vertical reciprocation sequentially (succeedingly).

Figure 21:
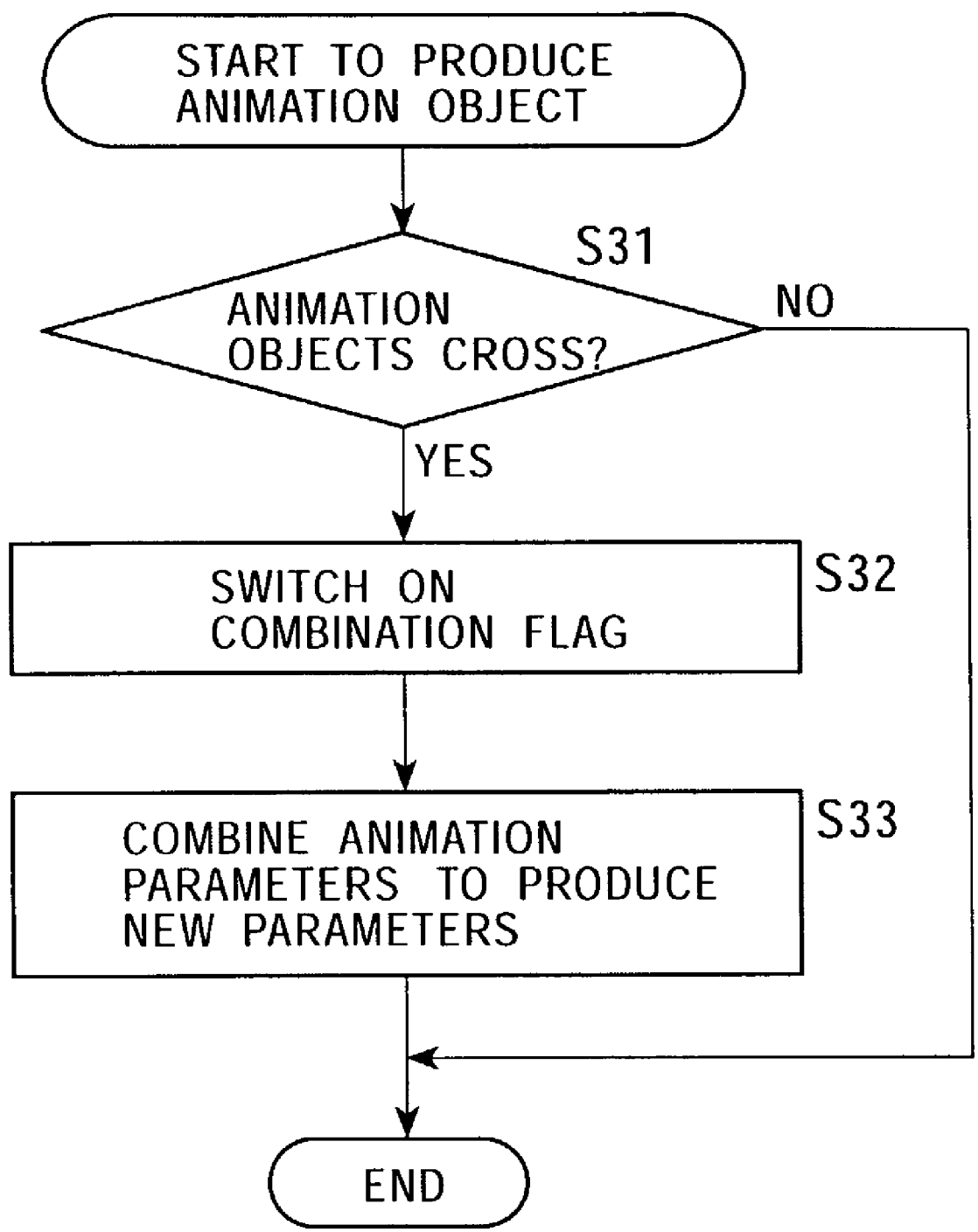
FIG. 21 is a flowchart for explaining production of an animation object.

The similar performance can be achieved by combining a plurality of animation objects together to produce one animation object. In other words, in this case, combining the plurality of animation objects together by the user, which is independently from a 3D object, enables a new animation object to be produced. FIG. 21 shows a process performed by the image processing program in this case.

In step S31, the image processing program determines whether or not the plurality of animation objects cross each other. If it is determined that the plurality of animation objects cross each other, the process proceeds to step S32.

In step S32, the image processing program switches on a combination flag indicating that the animation objects are combined together.

In step S33, the image processing program combines the animation parameters set to the plurality of animation objects together to produce new animation parameters. Then, the process is terminated.

In step S31, if it is determined that the plurality of animation objects do not cross each other, the image processing program determines that this process is not needed, and the process is terminated.

A fourth embodiment of the present invention in which combining the plurality of animation objects together to produce a new animation object, as shown in FIG. 21, and combining the new animation object with a 3D object allows animation operations based on the animation parameters of the different types of moving images to be performed on the 3D object simultaneously or sequentially will now be described with reference to FIG. 22. The system configuration and a flowchart in the fourth embodiment are the same as in the first embodiment. In this case, the animation parameters are set so that the animation operations are performed simultaneously or sequentially.

Figure 22:
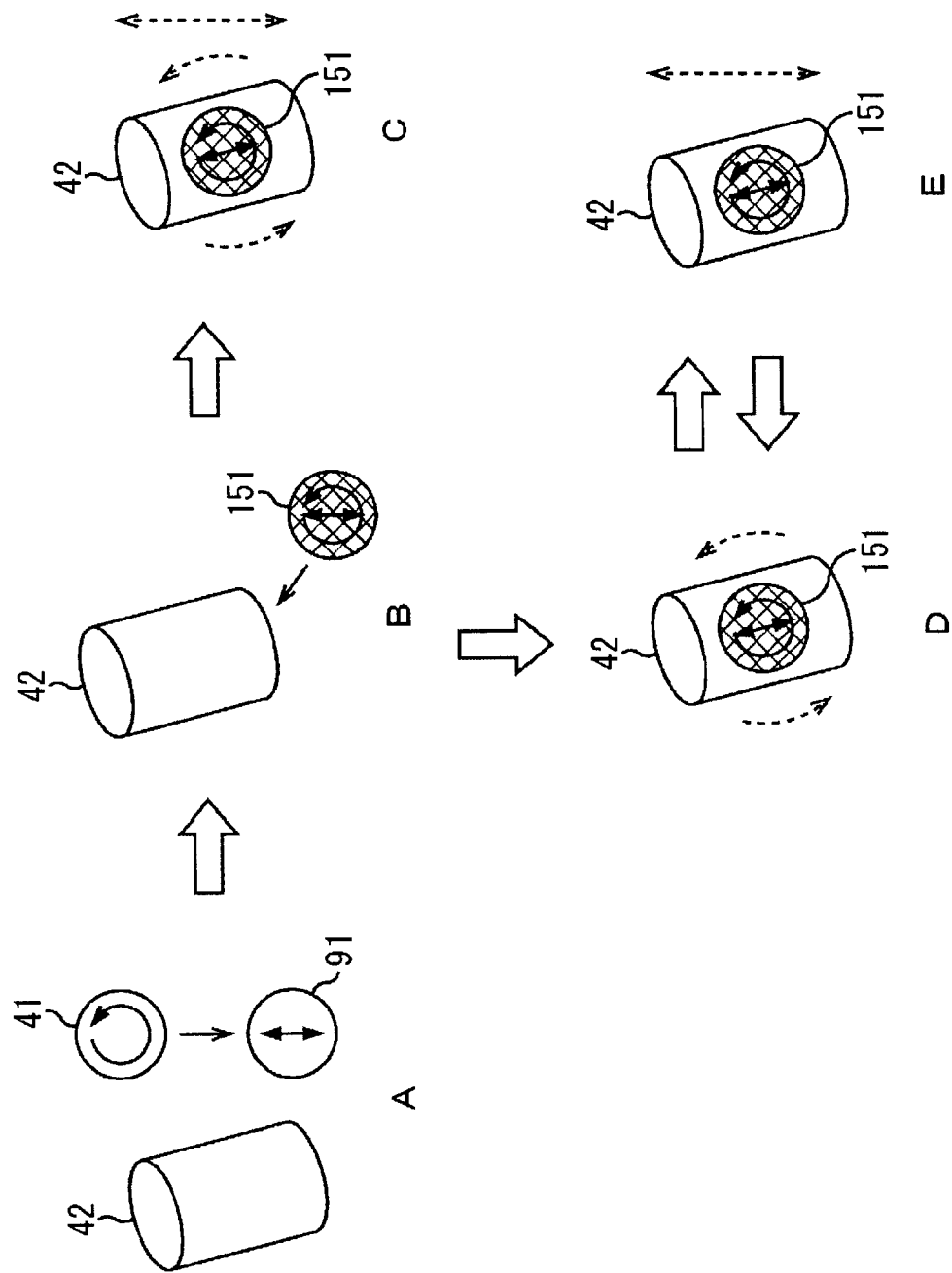
FIG. 22 includes an example of setting animation parameters.

Combining the counterclockwise-rotating animation object 41 with the vertical-reciprocating animation object 91, as shown in part A of FIG. 22, allows a new animation object 151 to which animation parameters of the counterclockwise rotation and the vertical reciprocation are set to be produced, as shown in part B of FIG. 22. This process is performed as in the process shown in the flowchart in FIG. 21.

At this time, the new animation object 151 is displayed so that it is easier for the user to recognize that both the animation parameters of the counterclockwise rotation and the vertical reciprocation are set to the new animation object 151. Thus, in the example shown in FIG. 22, an arrow indicating counterclockwise rotation and an arrow indicating vertical reciprocation are displayed. Then, combining the new animation object 151 with the 3D object 42 allows the animation parameters of the new animation object 151 to be set to the 3D object 42.

If the new animation parameters are set so that the animation operation based on the animation parameters of the counterclockwise rotation and the animation operation based on the animation parameters of the vertical reciprocation are performed simultaneously, both the animation operations are performed on the 3D object 42 at the same time, as shown in part C of FIG. 22.

If the new animation parameters are set so that the animation operation based on the animation parameters of the counterclockwise rotation and the animation operation based on the animation parameters of the vertical reciprocation are performed sequentially, after performing the animation operation based on the animation parameters of the counterclockwise rotation for a predetermined period of time, as shown in part D of FIG. 22, the animation operation based on the animation parameters of the vertical reciprocation is performed for a predetermined period of time, as shown in part E of FIG. 22. After performing the animation operation based on the animation parameters of the vertical reciprocation is terminated, the animation operation based on the animation parameters of the counterclockwise rotation is performed again, as shown in part D of FIG. 22. Then, the similar processing is repeated. Accordingly, in this example, animation operations based on the animation parameters of the different types of moving images are sequentially (succeedingly) performed.

As described above, combining the new animation object 151 produced by combining the counterclockwise-rotating animation object 41 with the vertical-reciprocating animation object 91 with a 3D object allows the animation operation similar to the animation operation performed in the case in which the counterclockwise-rotating animation object 41 and the vertical-reciprocating animation object 91 are individually combined with the 3D object can be achieved.

A fifth embodiment of the present invention in which combining an animation object with a 3D object allows animation parameters to be set to the 3D object, thus enabling the 3D object to be treated as the a new animation object will be described with reference to FIG. 23.

Figure 23:
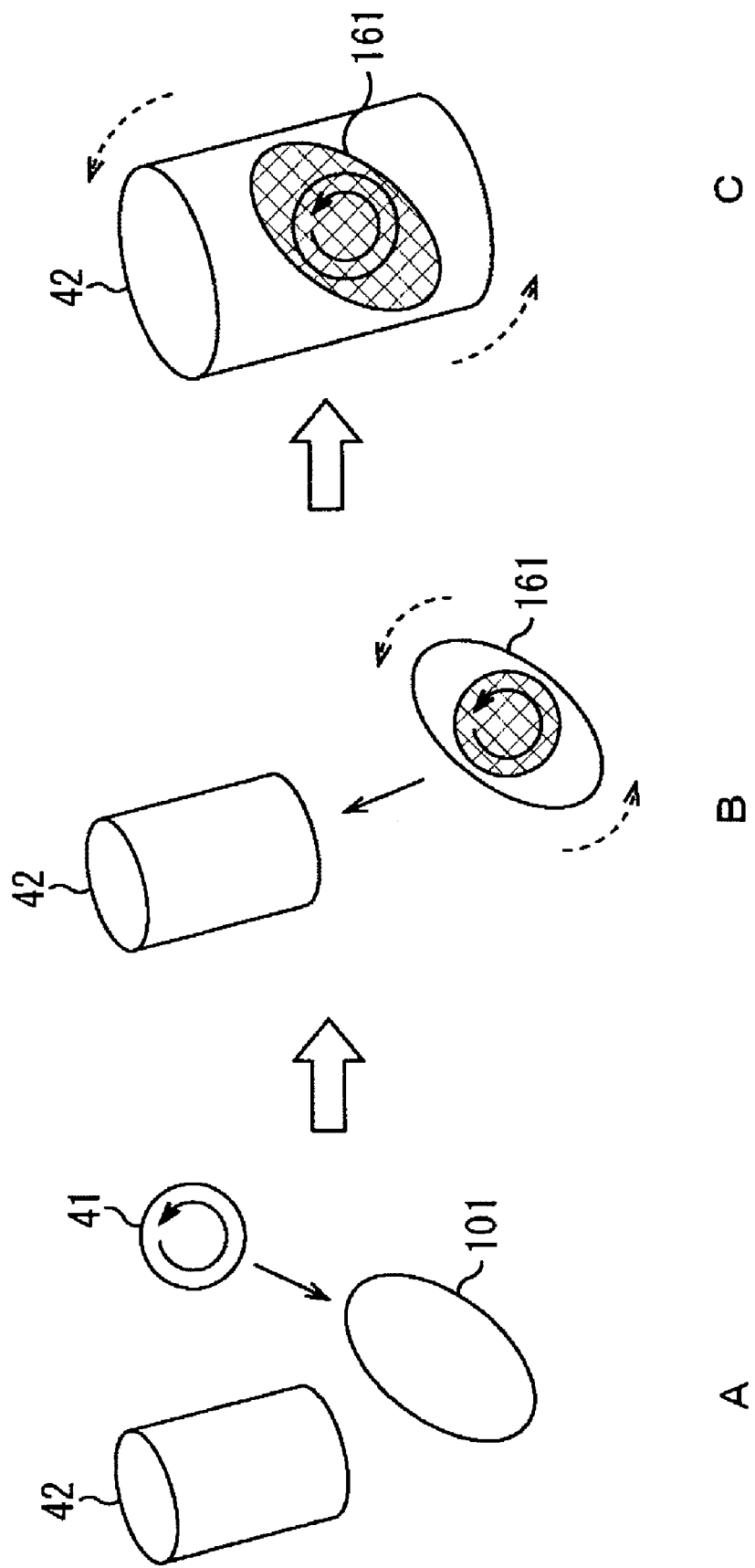
FIG. 23 includes another example of setting animation parameters.

Combining the counterclockwise-rotating animation object 41 with the 3D object 101, as shown in part A of FIG. 23, allows the 3D object 101 to initiate an animation operation based on animation parameters of counterclockwise rotation, as shown in part B of FIG. 23. Then, combining the 3D object 101 performing the animation operation based on the animation parameters of the counterclockwise rotation as a 3D object 161 functioning as a new animation object with the 3D object 42, as shown in part B of FIG. 23, allows the 3D object 42 to be integrated with the 3D object 101 and to perform the animation operation based on the animation parameters of the counterclockwise rotation, as shown in part C of FIG. 23. The new 3D object 161 is displayed so that the user can recognize that the new 3D object 161 has a function as an animation object. As is clear from the comparison between the 3D object 161 shown in part B of FIG. 23 and the 3D object 161 shown in part C of FIG. 23, the entire 3D object 161 has a color or brightness of the animation object.

A sixth embodiment of the present invention in which contacting one animation object with a plurality of 3D objects allows the plurality of 3D objects to be integrally animated will now be described with reference to FIG. 24.

Figure 24:
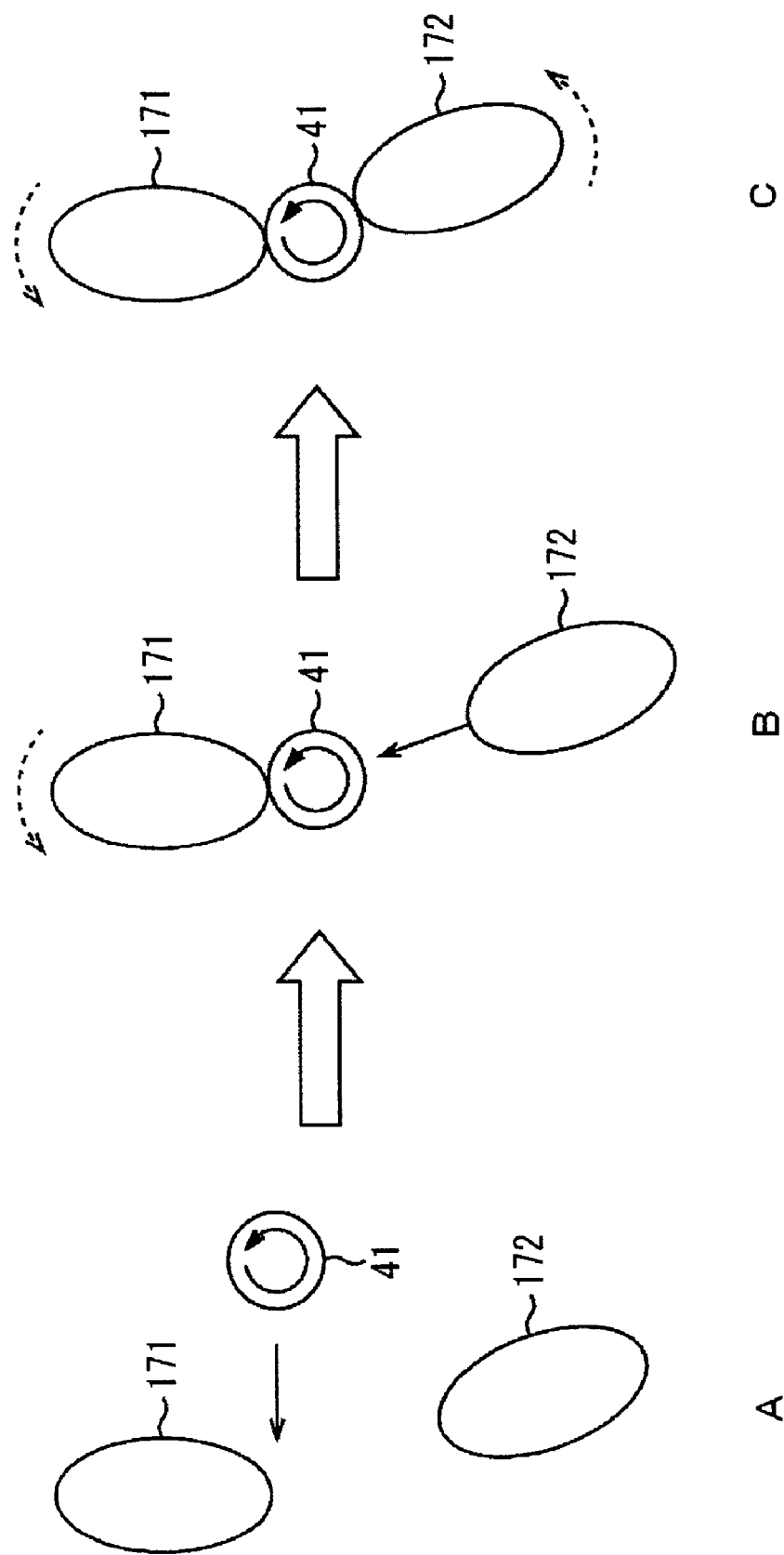
FIG. 24 includes illustrations of an example in which 3D objects are contacted with an animation object.

Contacting the counterclockwise-rotating animation object 41 with a 3D object 171, as shown in part A of FIG. 24, allows the 3D object 171 to perform an animation operation based on animation parameters of counterclockwise rotation around the counterclockwise-rotating animation object 41, as shown in part B of FIG. 24. Then, combining a 3D object 172 with the counterclockwise-rotating animation object 41 allows the 3D objects 171 and 172 to integrally perform the animation operation based on the animation parameters of the counterclockwise rotation around the counterclockwise-rotating animation object 41, as shown in part C of FIG. 24.

Figure 25:
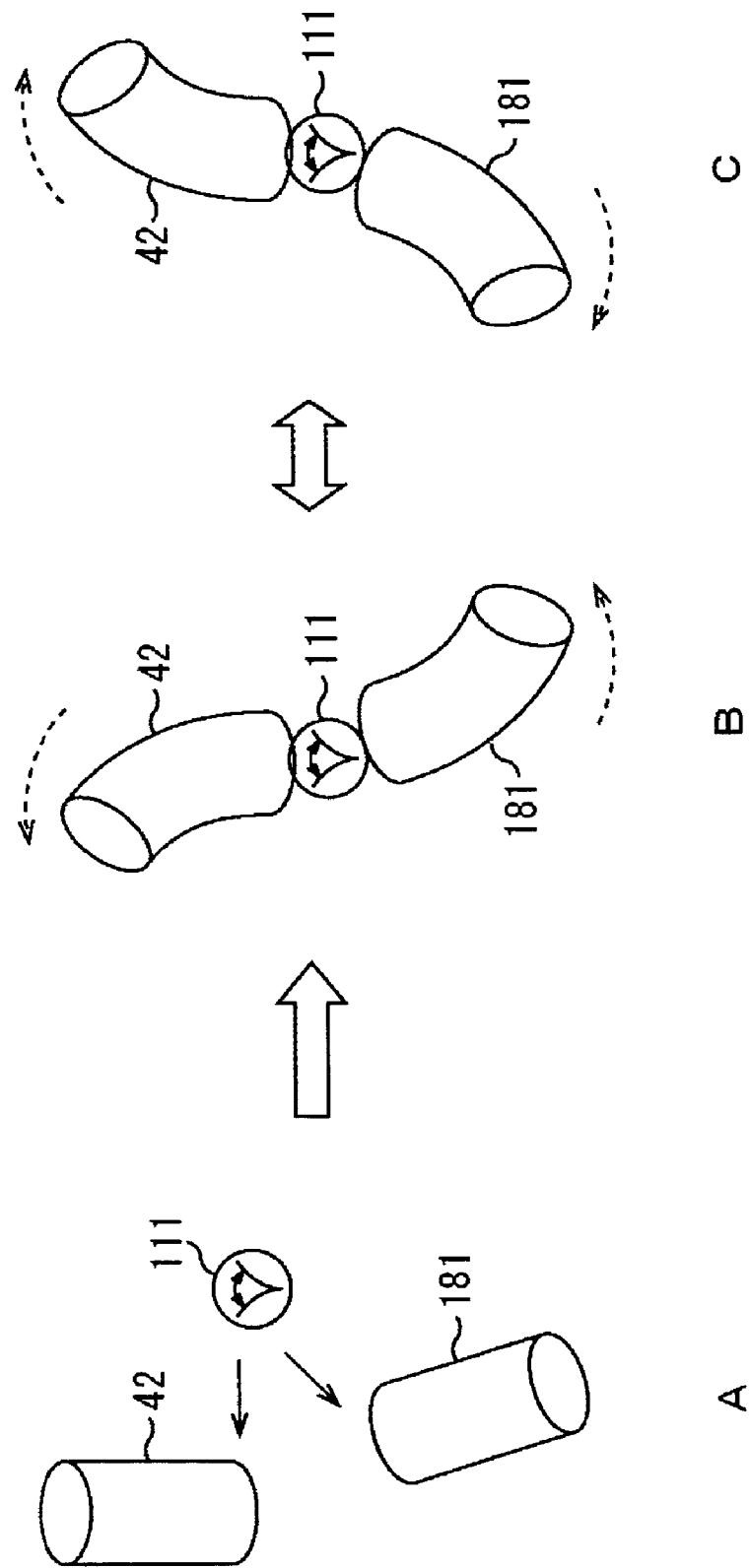
FIG. 25 includes illustrations of an example in which 3D objects are contacted with a deflection animation object.

Other examples in which an animation object is contacted with 3D objects will be described with reference to FIGS. 25 and 26. FIG. 25 shows an example in which the deflection animation object 111 is contacted with the 3D object 42 and a 3D object 181. In this case, the 3D objects 42 and 181 integrally bend to the left and right with respect to each of the portions contacting the deflection animation object 111.

Figure 26:
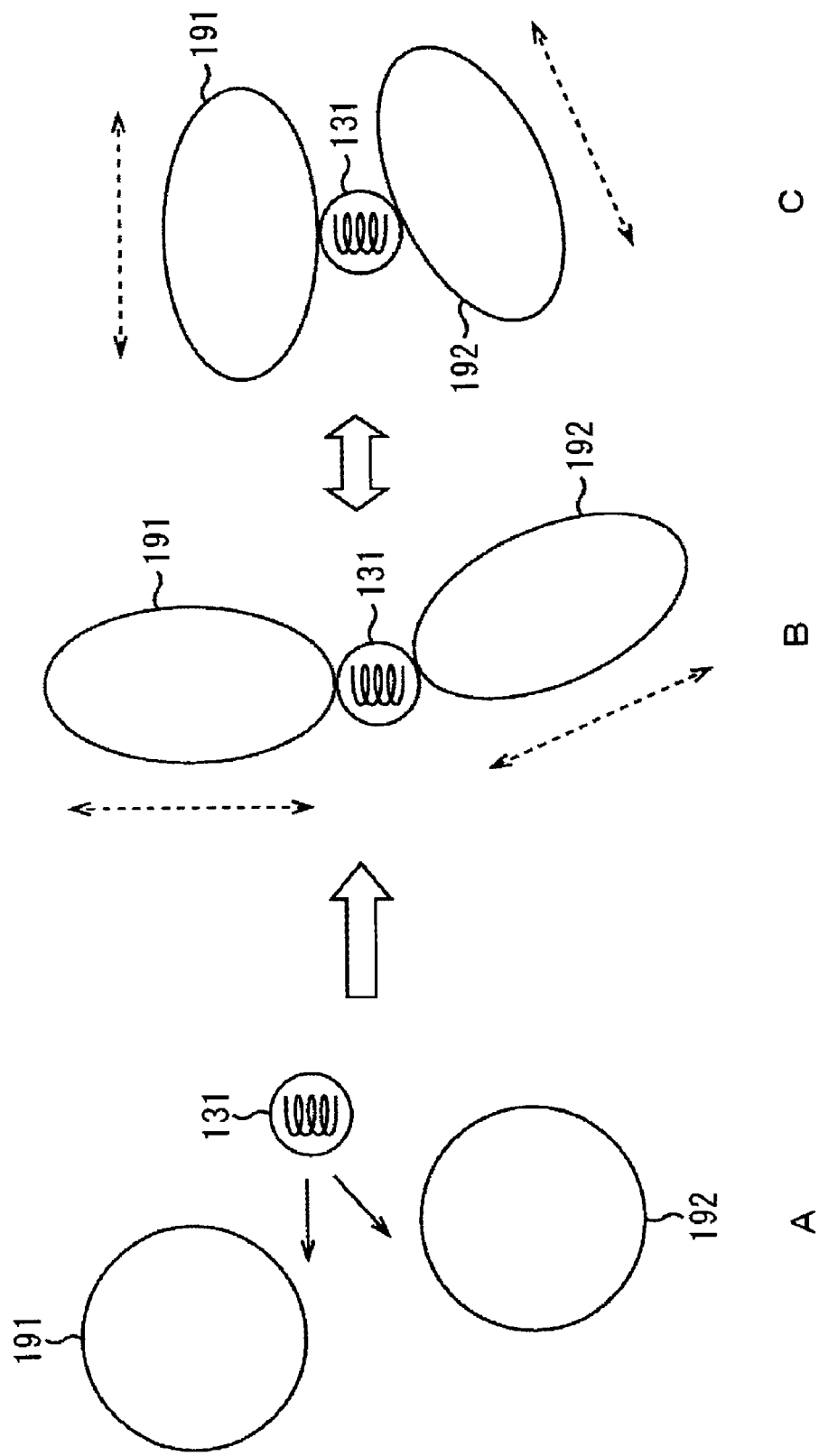
FIG. 26 includes illustrations of an example in which 3D objects are contacted with a stretch animation object.

FIG. 26 shows an example in which the stretch animation object 131 is contacted with 3D objects 191 and 192. In this case, the 3D objects 191 and 192 integrally expand and contract like rubber in the state of contacting the stretch animation object 131.

As described above, in the present invention, an animation object has various properties. Properties set to the animation object will now be described with reference to FIG. 27. The numbers in the table in FIG. 27 represents flag numbers indicating whether or not a property exists. "0" represents that an animation object has the specified property, and "1" represents that an animation object does not have the specified property.

An animation object has a property of "being contained", which means that the animation object is contained in a 3D object, (for example, refer to FIGS. 4 to 6, FIGS. 11 to 20, FIG. 22, and FIG. 23) or a property of "contacting", which means that the animation object contacts the 3D object, (for example, refer to FIGS. 24 to 26).

Each moving image has a "simultaneous property", which means that animation operations based on animation parameters of a plurality of moving images are simultaneously performed for a set period of time, (for example, refer to part C of each of FIGS. 19 and 22) or a "sequential property", which means that the animation operations based on the animation parameters of the plurality of moving images are sequentially repeated for a set period of time, (for example, refer to parts C to E of FIG. 20 and parts D and E of FIG. 22).

Each moving image has a property of "followed by lower order", which means that animation parameters set to a 3D object are followed by a lower-order 3D object (for example, refer to FIG. 17), a property of "followed by higher order", which means that animation parameters set to a 3D object are followed by a higher-order 3D object, or a property of "followed by all", which means that animation parameters set to a 3D object are followed by all the other 3D objects (for example, refer to FIG. 18), if animation parameters are set to one of a plurality of 3D objects combined together in which a priority is set to each of the combined 3D objects.

Each moving image has a property of "functioning as an animation object", which means that a 3D object combined with an animation object is treated as a new animation object (for example, refer to FIG. 23).

Figure 28:
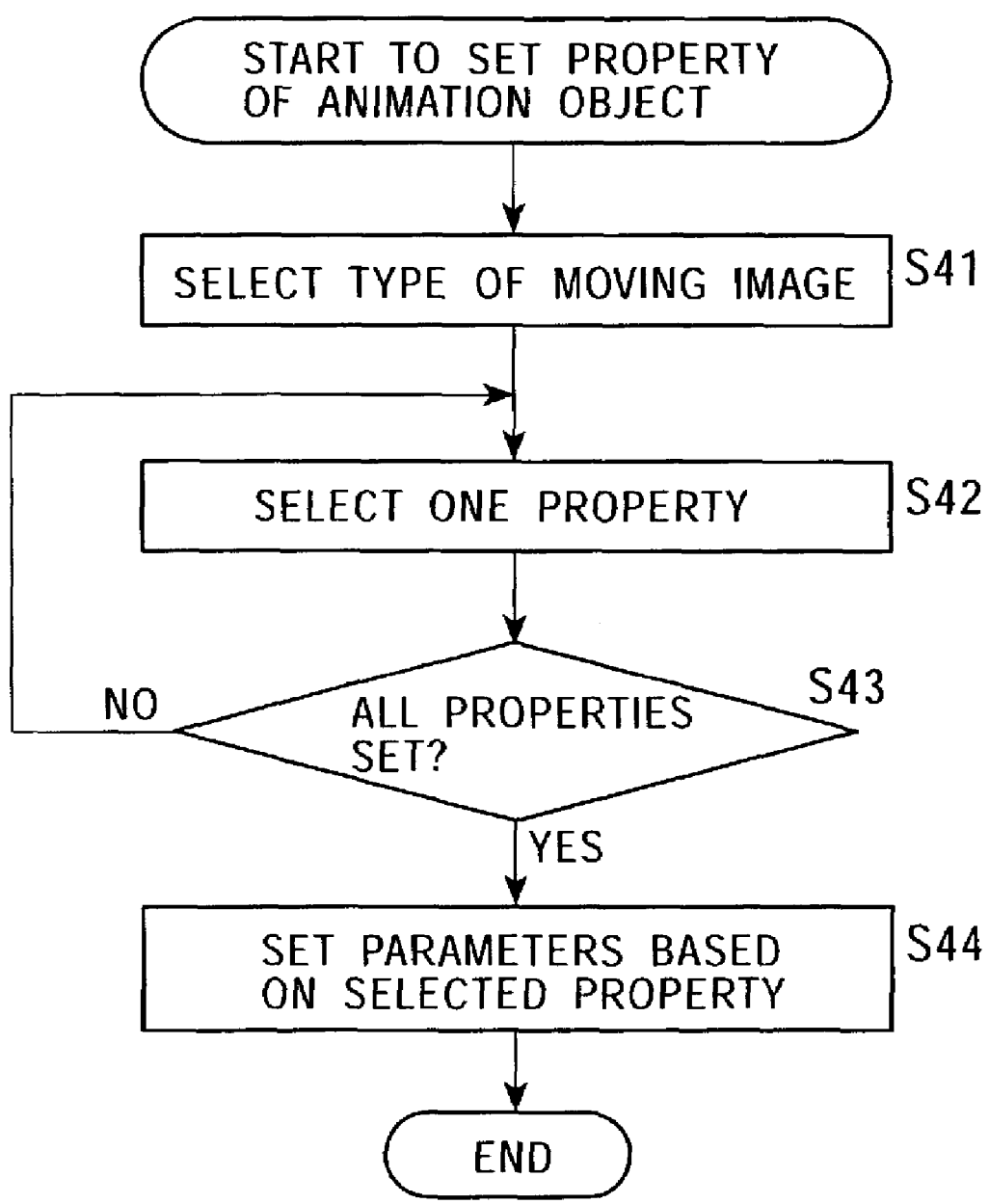
FIG. 28 is a flowchart for explaining processing of setting a property of an animation object.

An animation object property setting program performs a process in a flowchart shown in FIG. 28 when the user instructs to set a property of an animation object.

In step S41, the animation object property setting program selects a type of moving image in accordance with an instruction by the user.

In step S42, the animation object property setting program selects a property (for example, the property of "being contained" shown in FIG. 27).

In step S43, the animation object property setting program determines whether or not all the properties are set. If it is determined that all the properties have not yet been set in step S43, the process returns to step S42 in order to set a property which has not yet been set. If it is determined that all the properties are set in step S43, the process proceeds to step S44.

In step S44, the animation object property setting program sets animation parameters of the animation object in accordance with the property selected in step S42. Then, the processing for setting the animation parameters of the animation object is terminated.

For example, the animation object 41 shown in FIG. 19 is a counterclockwise-rotating animation object to which the property of "being contained" and the "simultaneous property" shown in FIG. 27 are set.

Although a series of the processing steps described above can be performed by hardware, they may be performed by software. If the series of the processing are performed by software, a program included in the software is installed in a computer mounted on special hardware or is installed, for example, in a general-purpose personal computer in which installing various programs enables the computer to perform various functions, via a network or by a recording medium.

The recording medium is formed by a package medium which is distributed in order to offer a program to a user independently from an apparatus unit. The package medium, in which the program is recorded, includes the magnetic disc 61 (including a floppy disk), the optical disc 62 (including a CD-ROM and a DVD), the magnetic optical disc 63 (including an MD), or the semiconductor memory 64, as shown in FIG. 2. The recording medium is also formed by the ROM 52 in which the program is recorded and a hard disc included in the storage unit 58. The ROM 52 and the hard disc are installed in the apparatus unit beforehand.

A case in which the steps for the program recorded in the recording medium described above are performed in accordance with a time series so as to follow the described sequence is included in the scope of the present invention. Also, a case in which the steps are performed without reference to a time series, that is, performed individually or at the same time is also included in the scope of the present invention.

The term "system" represents an apparatus unit that is formed by a plurality of units in descriptions of the present invention.

What is claimed is:

1. An image processing apparatus for displaying a three-dimensional object as a moving image, comprising:

designating means for designating a position and an attitude of an animation object to which animation parameters are set in advance and the three-dimensional object in a virtual three-dimensional space;

first determining means for determining whether or not the three-dimensional object and the animation object cross each other;

second determining means for determining whether or not the animation parameters set to the animation object are already set to the three-dimensional object, if the first determining means determines that the three-dimensional object and the animation object cross each other;

setting means for setting the animation parameters to the three-dimensional object if the second determining means determines that the animation parameters are not set to the three-dimensional object; and display control means for controlling the three-dimensional object to be displayed in accordance with the animation parameters set by the setting means.

2. An image processing apparatus according to claim 1, further comprising first operating means for instructing combination of the three-dimensional object and the animation object, wherein the animation parameters are set when the combination is instructed.

3. An image processing apparatus according to claim 1, further comprising canceling means for canceling the setting of the animation parameters for the three-dimensional object if the second determining means determines that the animation parameters are already set to the three-dimensional object.

4. An image processing apparatus according to claim 3, further comprising second operating means for instructing release of combination of the three-dimensional object and the animation object, wherein the setting of the animation parameters are released when the release of the combination is instructed.

5. An image processing apparatus according to claim 1, wherein the setting means sets animation parameters of different types of moving images to the three-dimensional object if different types of animation objects cross the three dimensional object.

6. An image processing apparatus according to claim 5, wherein the different types of moving images appear simultaneously or sequentially.

7. An image processing apparatus according to claim 1, wherein the animation object has a property of contacting the three-dimensional object or a property of being contained in the three-dimensional object.

8. An image processing apparatus according to claim 1, wherein the animation object causes the three-dimensional object being crossed with the animation object to function as an animation object.

9. An image processing method in an image processing apparatus for displaying a three-dimensional object as a moving image, comprising:

a designating step of designating a position and an attitude of an animation object to which animation parameters are set in advance and the three-dimensional object in a virtual three-dimensional space;

a first determining step of determining whether or not the three-dimensional object and the animation object cross each other;

a second determining step of determining whether or not the animation parameters set to the animation object are already set to the three-dimensional object, if it is determined by the processing in the first determining step that the three-dimensional object and the animation object cross each other;

a setting step of setting the animation parameters to the three-dimensional object if it is determined by the processing in the second determining step that the animation parameters are not set to the three-dimensional object; and a display control step of controlling the three-dimensional object to be displayed in accordance with the animation parameters set by the processing in the setting step.

10. A recording medium storing a computer-readable program, the program executed in an image processing apparatus for displaying a three-dimensional object as a moving image, comprising:

a designating step of designating a position and an attitude of an animation object to which animation parameters are set in advance and the three-dimensional object in a virtual three-dimensional space;

a first determining step of determining whether or not the three-dimensional object and the animation object cross each other;

a second determining step of determining whether or not the animation parameters set to the animation object are already set to the three-dimensional object, if it is determined by the processing in the first determining step that the three-dimensional object and the animation object cross each other;

a setting step of setting the animation parameters to the three-dimensional object if it is determined by the processing in the second determining step that the animation parameters are not set to the three-dimensional object; and a display control step of controlling the three-dimensional object to be displayed in accordance with the animation parameters set by the processing in the setting step.

11. A program executed by a computer on a computer-readable medium, said computer operating as an image processing apparatus for displaying a three-dimensional object as a moving image to perform a process comprising:

a designating step of designating a position and an attitude of an animation object to which animation parameters are set in advance and the three-dimensional object in a virtual three-dimensional space;

a first determining step of determining whether or not the three-dimensional object and the animation object cross each other;

a second determining step of determining whether or not the animation parameters set to the animation object are already set to the three-dimensional object, if it is determined by the processing in the first determining step that the three-dimensional object and the animation object cross each other;

a setting step of setting the animation parameters to the three-dimensional object if it is determined by the processing in the second determining step that the animation parameters are not set to the three-dimensional object; and a display control step of controlling the three-dimensional object to be displayed in accordance with the animation parameters set by the processing in the setting step.

* * * * *